United States Patent [19]

Fujimoto

[11] Patent Number: 5,751,921
[45] Date of Patent: May 12, 1998

[54] DOCUMENT IMAGE PROCESSING DEVICE FOR CONVERTING MONOCHROME IMAGES TO COLOR IMAGES

[75] Inventor: Masakazu Fujimoto, Kanagawa, Japan

[73] Assignee: Fuji Xerox Co., Ltd., Tokyo, Japan

[21] Appl. No.: 781,520

[22] Filed: Jan. 9, 1997

Related U.S. Application Data

[63] Continuation of Ser. No. 325,935, Oct. 19, 1994, abandoned.

[30] Foreign Application Priority Data

Oct. 20, 1993 [JP] Japan .................................. 5-284155

[51] Int. Cl.⁶ ............................................. G06F 15/00
[52] U.S. Cl. ................................... 395/109; 395/131
[58] Field of Search .................................. 395/101, 106, 395/109, 127, 128, 131, 570; 358/515, 517, 518, 537, 538, 448, 447, 532; 345/72, 83, 153, 154; 396/305; 399/39; 382/162, 163, 164, 165, 167; 348/34, 35

[56] References Cited

U.S. PATENT DOCUMENTS

| | | | |
|---|---|---|---|
| 4,389,634 | 6/1983 | Nakamura | 382/182 |
| 4,469,433 | 9/1984 | Kurata et al. | 358/503 |
| 4,914,486 | 4/1990 | Higashio et al. | 399/87 |
| 4,991,223 | 2/1991 | Bradley | 382/165 |
| 4,998,165 | 3/1991 | Lindstrom | 348/34 |
| 5,027,196 | 6/1991 | Ono et al. | 358/527 |
| 5,031,121 | 7/1991 | Iwai et al. | 395/777 |
| 5,079,625 | 1/1992 | Kitamura et al. | 358/537 |
| 5,283,671 | 2/1994 | Stewart et al. | 358/532 |
| 5,365,430 | 11/1994 | Jagadish | 395/759 |

*Primary Examiner*—Joseph Mancuso
*Assistant Examiner*—Gabriel I. Garcia
*Attorney, Agent, or Firm*—Finnegan, Henderson, Farabow, Garrett & Dunner, L.L.P.

[57] ABSTRACT

A document image processing device segments a set of pixels in a document into a plurality of regions and classifies the sizes of the characters in the segmented regions. The characters are converted into a color image based on information indicating correspondence between size and color of the characters. An image is generated for an output document on the basis of the converted color image.

7 Claims, 47 Drawing Sheets

| | MAGNIFICATION RATE | HEIGHT OF THE RECTANGLE |
|---|---|---|
| AVERAGE VALUE | 1.0 | 5.9 |
| THRESHOLD LEVEL 1 | 0.9 | 5.3 |
| THRESHOLD LEVEL 2 | 1.1 | 6.5 |
| THRESHOLD LEVEL 3 | 1.5 | 8.9 |

*FIG. 8*

| MAGNIFICATION RATE | SETTING | | | | |
|---|---|---|---|---|---|
| | SIZE | COLOR | | | |
| | | C | M | Y | K |
| ~0.9 | 0.8 | 50 | 0 | 50 | 0 |
| 0.9~1.1 | 1.0 | 0 | 0 | 0 | 100 |
| 1.1~1.5 | 1.2 | 100 | 0 | 0 | 0 |
| 1.5~ | 1.5 | 0 | 100 | 100 | 0 |

*FIG. 9*

|  | % | | | |
|---|---|---|---|---|
|  | M | C | Y | K |
| AVERAGE VALUE | 4 | 12 | 9 | 91 |
| THRESHOLD LEVEL M | 14 | 0 | 0 | 0 |
| THRESHOLD LEVEL C | 0 | 22 | 0 | 0 |
| THRESHOLD LEVEL Y | 0 | 0 | 19 | 0 |

FIG. 19

| COLOR | | | SIZE |
|---|---|---|---|
| C | M | Y | |
| 0 | 0 | 0 | 1.0 |
| 0 | 0 | 1 | 0.6 |
| 0 | 1 | 0 | 1.2 |
| 0 | 1 | 1 | 0.8 |
| 1 | 0 | 0 | 1.8 |
| 1 | 0 | 1 | 2.4 |
| 1 | 1 | 0 | 1.4 |
| 1 | 1 | 1 | 1.0 |

0: LESS THAN THE DISTINCTION CRITERION
1: EQUAL OR LARGER THAN THE DISTINCTION CRITERION

FIG. 20

| NO. | TYPE | TOP LEFT X-COOR-DINATE | TOP LEFT Y-COOR-DINATE | RECTAN-GLE WIDTH | RECTAN-GLE HEIGHT | THE NUMBER OF SUBCON-STITUENT | STARTING NUMBER (ADDRESS) OF SUBCON-STITUENT |
|---|---|---|---|---|---|---|---|
| 1 | CHARACTER BLOCK | 140 | 20 | 64 | 7 | 1 | 11 |
| 2 | CHARACTER BLOCK | 20 | 35 | 120 | 5 | 1 | 12 |

| 11 | CHARACTER LINE | 140 | 20 | 64 | 7 | 10 | 50 |
|---|---|---|---|---|---|---|---|
| 12 | CHARACTER LINE | 20 | 35 | 120 | 5 | 20 | 60 |

| 50 | CHARACTER | 140 | 20 | 6 | 7 | 0 | 2000 |
|---|---|---|---|---|---|---|---|
| 59 | CHARACTER | 200 | 20 | 4 | 5 | 0 | 2008 |

| ADDRESS | TYPE | DATA LENGTH | LINE LENGTH | STARTING ADDRESS |
|---|---|---|---|---|
| 2000 | BITMAP | 1344 | 12 | 5000 |
| 2008 | BITMAP | 640 | 8 | 6344 |

FIG. 26

| LOGICAL NAME | LOGICAL IDENTIFIER |
|---|---|
| TEXT | 1 |
| TITLE | 2 |
| SUBTITLE | 3 |
| PAGE NUMBER | 4 |
| CATCHWORD | 5 |
| FOOTNOTE | 6 |
| FOOTNOTE LINE | 7 |
| AUTHOR | 8 |

*FIG. 27*

| LOGICAL NAME | CONSTITUENT NUMBER | LOGICAL IDENTIFIER |
|---|---|---|
| CATCHWORD | 1 | 5 |
| TITLE | 2 | 2 |
| AUTHOR | 3 | 8 |
| SUBTITLE 1 | 5 | 3 |
| TEXT 1 | 4 | 1 |
| SUBTITLE 2 | 8 | 3 |
| TEXT 2 | 7 | 1 |
| FOOTNOTE LINE | 6 | 7 |
| FOOTNOTE | 10 | 6 |
| PAGE NUMBER | 9 | 4 |

*FIG. 29*

| NO. | TYPE | TOP LEFT X-COOR-DINATE | TOP LEFT Y-COOR-DINATE | RECTAN-GLE WIDTH | RECTAN-GLE HEIGHT | THE NUMBER OF SUBCON-STITUENT | LOGICAL IDENTIFIER | STARTING NUMBER (ADDRESS) OF SUBCON-STITUENT |
|---|---|---|---|---|---|---|---|---|
| 1 | CHARACTER BLOCK | 140 | 20 | 64 | 7 | 1 | 5 | 11 |
| 2 | CHARACTER BLOCK | 20 | 35 | 120 | 5 | 1 | 2 | 12 |

| 11 | CHARACTER LINE | 140 | 20 | 64 | 7 | 10 | 0 | 50 |
|---|---|---|---|---|---|---|---|---|
| 12 | CHARACTER LINE | 20 | 35 | 120 | 5 | 20 | 0 | 60 |

| 50 | CHARACTER | 140 | 20 | 6 | 7 | 0 | 0 | 2000 |
|---|---|---|---|---|---|---|---|---|
| 59 | CHARACTER | 200 | 20 | 4 | 5 | 0 | 0 | 2008 |

| ADDRESS | TYPE | DATA LENGTH | LINE LENGTH | STARTING ADDRESS |
|---|---|---|---|---|
| 2000 | BITMAP | 1344 | 12 | 5000 |
| 2008 | BITMAP | 640 | 8 | 6344 |

*FIG. 30*

| LOGICAL NAME | LOGICAL IDENTIFIER | AVERAGE HEIGHT OF RECTANGLE | THRESHOLD LEVEL |
|---|---|---|---|
| TEXT | 1 | 6.0 | 6.6 |
| TITLE | 2 | 8.8 | 9.7 |
| SUBTITLE | 3 | 7.5 | 8.3 |
| PAGE NUMBER | 4 | 5.0 | 5.5 |
| CATCHWORD | 5 | 4.9 | 5.4 |
| FOOTNOTE | 6 | 5.1 | 5.6 |
| FOOTNOTE LINE | 7 | 0.5 | 0.6 |
| AUTHOR | 8 | 5.0 | 5.5 |

*FIG. 31*

| NO. | TYPE | TOP LEFT X-COOR-DINATE | TOP LEFT Y-COOR-DINATE | RECTAN-GLE WIDTH | RECTAN-GLE HEIGHT | THE NUMBER OF SUBCON-STITUENT | LOGICAL IDENTIFIER | STARTING NUMBER (ADDRESS) OF SUBCON-STITUENT |
|---|---|---|---|---|---|---|---|---|
| 1 | CHARACTER BLOCK | 140 | 20 | 64 | 7 | 1 | 5 | 11 |
| 2 | CHARACTER BLOCK | 20 | 35 | 120 | 5 | 1 | 2 | 12 |

⋮

| 11 | CHARACTER LINE | 140 | 20 | 64 | 7 | 10 | 0 | 50 |
| 12 | CHARACTER LINE | 20 | 35 | 120 | 5 | 20 | 0 | 60 |

⋮

| 50 | CHARACTER | 140 | 20 | 6 | 7 | 0 | 0 | 2000 |

⋮

| 59 | CHARACTER | 200 | 20 | 4 | 5 | 0 | 0 | 2008 |

| ADDRESS | TYPE | DISTINCTION RESULT | DATA LENGTH | LINE LENGTH | STARTING ADDRESS |
|---|---|---|---|---|---|
| 2000 | BITMAP | EMPHASIZED CHARACTER | 1344 | 12 | 5000 |
| 2008 | BITMAP | NORMAL CHARACTER | 640 | 8 | 6344 |

*FIG. 32*

| LOGICAL IDENTIFIER | LOGICAL NAME | EMPHASIZED PART | | | | | NORMAL PART | | | | |
|---|---|---|---|---|---|---|---|---|---|---|---|
| | | SIZE | COLOR | | | | SIZE | COLOR | | | |
| | | | C | M | Y | K | | C | M | Y | K |
| 1 | TEXT | 1.0 | 100 | 0 | 0 | 0 | 1.0 | 0 | 0 | 0 | 100 |
| 2 | TITLE | 1.8 | 0 | 100 | 100 | 0 | 1.8 | 100 | 0 | 0 | 0 |
| 3 | SUBTITLE | 1.2 | 100 | 0 | 0 | 0 | 1.2 | 0 | 0 | 0 | 100 |
| 4 | PAGE NUMBER | 0.8 | 0 | 100 | 100 | 0 | 0.8 | 100 | 0 | 0 | 0 |
| 5 | CATCHWORD | 0.8 | 100 | 0 | 0 | 0 | 0.8 | 0 | 0 | 0 | 100 |
| 6 | FOOTNOTE | 0.8 | 100 | 100 | 0 | 0 | 0.8 | 100 | 0 | 0 | 100 |
| 7 | FOOTNOTE LINE | 1.5 | 0 | 0 | 0 | 0 | 1.0 | 0 | 0 | 0 | 0 |
| 8 | AUTHOR | 0.8 | 100 | 0 | 0 | 0 | 0.8 | 0 | 0 | 0 | 100 |

FIG. 33

| NO. | TYPE | TOP LEFT X-COOR-DINATE | TOP LEFT Y-COOR-DINATE | RECTAN-GLE WIDTH | RECTAN-GLE HEIGHT | THE NUMBER OF SUBCON-STITUENT | LOGICAL IDENTIFIER | STARTING NUMBER (ADDRESS) OF SUBCON-STITUENT |
|---|---|---|---|---|---|---|---|---|
| 1 | CHARACTER BLOCK | 140 | 20 | 50 | 5 | 1 | 5 | 11 |
| 2 | CHARACTER BLOCK | 20 | 35 | 120 | 5 | 1 | 2 | 12 |

⋮

| 11 | CHARACTER LINE | 140 | 20 | 50 | 5 | 10 | 0 | 50 |
| 12 | CHARACTER LINE | 20 | 35 | 120 | 5 | 20 | 0 | 60 |

⋮

| 50 | CHARACTER | 140 | 20 | 4 | 5 | 0 | 0 | 2000 |

⋮

| 59 | CHARACTER | 186 | 20 | 4 | 5 | 0 | 0 | 2008 |

| ADDRESS | TYPE | DISTINCTION RESULT | DATA LENGTH | LINE LENGTH | STARTING ADDRESS |
|---|---|---|---|---|---|
| 2000 | PIXMAP | EMPHASIZED CHARACTER | 1920 | 24 | 9000 |
| 2008 | BITMAP | NORMAL CHARACTER | 640 | 8 | 6120 |

*FIG. 34*

| NO. | TYPE | TOP LEFT X-COOR-DINATE | TOP LEFT Y-COOR-DINATE | RECTAN-GLE WIDTH | RECTAN-GLE HEIGHT | THE NUMBER OF SUBCON-STITUENT | STARTING NUMBER (ADDRESS) OF SUBCON-STITUENT |
|---|---|---|---|---|---|---|---|
| 1 | CHARACTER BLOCK | 140 | 20 | 50 | 5 | 1 | 11 |
| 2 | CHARACTER BLOCK | 20 | 35 | 120 | 5 | 1 | 12 |

| 11 | CHARACTER LINE | 140 | 20 | 50 | 5 | 10 | 50 |
|---|---|---|---|---|---|---|---|
| 12 | CHARACTER LINE | 20 | 35 | 120 | 5 | 20 | 60 |

| 50 | CHARACTER | 140 | 20 | 4 | 5 | 0 | 2000 |
|---|---|---|---|---|---|---|---|

| 59 | CHARACTER | 186 | 20 | 4 | 5 | 0 | 2008 |
|---|---|---|---|---|---|---|---|

| ADDRESS | TYPE | DATA LENGTH | LINE LENGTH | STARTING ADDRESS |
|---|---|---|---|---|
| 2000 | PIXMAP | 1920 | 24 | 5000 |
| 2008 | BITMAP | 640 | 8 | 6920 |

FIG. 42

| NO. | TYPE | TOP LEFT X-COOR-DINATE | TOP LEFT Y-COOR-DINATE | RECTAN-GLE WIDTH | RECTAN-GLE HEIGHT | THE NUMBER OF SUBCON-STITUENT | LOGICAL IDENTIFIER | STARTING NUMBER (ADDRESS) OF SUBCON-STITUENT |
|---|---|---|---|---|---|---|---|---|
| 1 | CHARACTER BLOCK | 140 | 20 | 50 | 5 | 1 | 5 | 11 |
| 2 | CHARACTER BLOCK | 20 | 35 | 120 | 5 | 1 | 2 | 12 |
| ⋮ | | | | | | | | |
| 11 | CHARACTER LINE | 140 | 20 | 50 | 5 | 10 | 0 | 50 |
| 12 | CHARACTER LINE | 20 | 35 | 120 | 5 | 20 | 0 | 60 |
| ⋮ | | | | | | | | |
| 50 | CHARACTER | 140 | 20 | 4 | 5 | 0 | 0 | 2000 |
| ⋮ | | | | | | | | |
| 59 | CHARACTER | 186 | 20 | 4 | 5 | 0 | 0 | 2008 |

| ADDRESS | TYPE | DATA LENGTH | LINE LENGTH | STARTING ADDRESS |
|---|---|---|---|---|
| 2000 | PIXMAP | 1920 | 24 | 5000 |
| 2008 | BITMAP | 640 | 8 | 6920 |

FIG. 43

| LOGICAL NAME | LOGICAL IDENTIFIER | AVERAGE VALUE | | | THRESHOLD LEVEL | | |
|---|---|---|---|---|---|---|---|
| | | C | M | Y | C | M | Y |
| TEXT | 1 | 2 | 0 | 0 | 12 | 0 | 0 |
| TITLE | 2 | 20 | 0 | 0 | 30 | 0 | 0 |
| SUBTITLE | 3 | 20 | 0 | 0 | 30 | 0 | 0 |
| PAGE NUMBER | 4 | 0 | 0 | 0 | 10 | 0 | 0 |
| CATCHWORD | 5 | 20 | 0 | 0 | 30 | 0 | 0 |
| FOOTNOTE | 6 | 10 | 0 | 0 | 20 | 0 | 0 |
| FOOTNOTE LINE | 7 | 0 | 0 | 0 | 10 | 0 | 0 |
| AUTHOR | 8 | 0 | 0 | 0 | 10 | 0 | 0 |

*FIG. 44*

| NO. | TYPE | TOP LEFT X-COOR-DINATE | TOP LEFT Y-COOR-DINATE | RECTAN-GLE WIDTH | RECTAN-GLE HEIGHT | THE NUMBER OF SUBCON-STITUENT | LOGICAL IDENTIFIER | STARTING NUMBER (ADDRESS) OF SUBCON-STITUENT |
|---|---|---|---|---|---|---|---|---|
| 1 | CHARACTER BLOCK | 140 | 20 | 50 | 5 | 1 | 5 | 11 |
| 2 | CHARACTER BLOCK | 20 | 35 | 120 | 5 | 1 | 2 | 12 |

| 11 | CHARACTER LINE | 140 | 20 | 50 | 5 | 10 | 0 | 50 |
|---|---|---|---|---|---|---|---|---|
| 12 | CHARACTER LINE | 20 | 35 | 120 | 5 | 20 | 0 | 60 |

| 50 | CHARACTER | 140 | 20 | 4 | 5 | 0 | 0 | 2000 |
|---|---|---|---|---|---|---|---|---|

| 59 | CHARACTER | 186 | 20 | 4 | 5 | 0 | 0 | 2008 |
|---|---|---|---|---|---|---|---|---|

| ADDRESS | TYPE | DISTINCTION RESULT | DATA LENGTH | LINE LENGTH | STARTING ADDRESS |
|---|---|---|---|---|---|
| 2000 | PIXMAP | EMPHASIZED CHARACTER | 1920 | 24 | 5000 |
| 2008 | BITMAP | NORMAL CHARACTER | 640 | 8 | 6920 |

*FIG. 45*

| LOGICAL IDENTIFIER | LOGICAL NAME | EMPHASIZED PART | | | | | NORMAL PART | | | | |
|---|---|---|---|---|---|---|---|---|---|---|---|
| | | SIZE | COLOR | | | | SIZE | COLOR | | | |
| | | | C | M | Y | K | | C | M | Y | K |
| 1 | TEXT | 1.2 | 0 | 0 | 0 | 100 | 1.0 | 0 | 0 | 0 | 100 |
| 2 | TITLE | 2.4 | 0 | 0 | 0 | 100 | 1.8 | 0 | 0 | 0 | 100 |
| 3 | SUBTITLE | 1.4 | 0 | 0 | 0 | 100 | 1.2 | 0 | 0 | 0 | 100 |
| 4 | PAGE NUMBER | 1.0 | 0 | 0 | 0 | 100 | 0.8 | 0 | 0 | 0 | 100 |
| 5 | CATCHWORD | 1.0 | 0 | 0 | 0 | 100 | 0.8 | 0 | 0 | 0 | 100 |
| 6 | FOOTNOTE | 1.0 | 0 | 0 | 0 | 100 | 0.8 | 0 | 0 | 0 | 100 |
| 7 | FOOTNOTE LINE | 1.2 | 0 | 0 | 0 | 100 | 1.0 | 0 | 0 | 0 | 100 |
| 8 | AUTHOR | 1.0 | 0 | 0 | 0 | 100 | 0.8 | 0 | 0 | 0 | 100 |

FIG. 46

| NO. | TYPE | TOP LEFT X-COOR- DINATE | TOP LEFT Y-COOR- DINATE | RECTAN- GLE WIDTH | RECTAN- GLE HEIGHT | THE NUMBER OF SUBCON- STITUENT | LOGICAL IDENTIFIER | STARTING NUMBER (ADDRESS) OF SUBCON- STITUENT |
|---|---|---|---|---|---|---|---|---|
| 1 | CHARACTER BLOCK | 140 | 20 | 64 | 7 | 1 | 5 | 11 |
| 2 | CHARACTER BLOCK | 20 | 35 | 120 | 5 | 1 | 2 | 12 |

⋮

| 11 | CHARACTER LINE | 140 | 20 | 64 | 7 | 10 | 0 | 50 |
|---|---|---|---|---|---|---|---|---|
| 12 | CHARACTER LINE | 20 | 35 | 120 | 5 | 20 | 0 | 60 |

⋮

| 50 | CHARACTER | 140 | 20 | 6 | 7 | 0 | 0 | 2000 |
|---|---|---|---|---|---|---|---|---|

⋮

| 59 | CHARACTER | 200 | 20 | 4 | 5 | 0 | 0 | 2008 |

| ADDRESS | TYPE | DATA LENGTH | LINE LENGTH | STARTING ADDRESS |
|---|---|---|---|---|
| 2000 | BITMAP | 1344 | 12 | 9000 |
| 2008 | BITMAP | 640 | 8 | 6920 |

FIG. 47

DOCUMENT IMAGE PROCESSING DEVICE FOR CONVERTING MONOCHROME IMAGES TO COLOR IMAGES

This application is a continuation of application Ser. No. 08/325,935, filed Oct. 19, 1994, now abandoned.

BACKGROUND OF THE INVENTION

1. Field of the Invention

The present invention relates to a document processing device such as a copying machine, and in particular relates to a document image processing device for conversion between a monochrome (black-and-white) image and a color image.

2. Discussion of the Related Art

Conventionally, most documents accepted by document processing apparatuses such as word processors, copying machines and facsimile apparatuses are monochrome documents in general. However, color document processing apparatuses have been recently improved, whereby opportunities to process color documents gradually increase. However, processing, outputting or storing the color document is more expensive than to processing, outputting or storing the monochrome document; therefore effect of the color document is weighed against its cost. Under the existing circumstances, both of the monochrome document and the color document are employed, that is, not all the monochrome documents are switched over to the color documents. Moreover, the effect of the color document depends on circumstances, and consequently the color documents are effective in some cases and the monochrome documents are effective in other cases though these documents are originally identical. Therefore, editing and processing of documents such as coloring of a monochrome document to form a color document, or copying of a color document in a monochrome mode are frequently carried out.

However, in coloring and editing of the monochrome document, regions to be colored, coloring methods such as color conversion, filling or positive-negative inversion, and colors to be used must be specified, thus requiring much labor. Furthermore, the user without knowledge of design cannot determine how to apply colors on the document. In the monochrome document unexpected to be converted into color document, namely the document completed in monochrome, character emphasis is carried out by, for example, character size enlarging; accordingly, simple color conversion of the emphasized part involves possibility of unintentionally producing an unimpressive, unattractive document with low color effect.

In the case of copying a color document in the monochrome mode, it does not take much labor. However, in the color document, most character emphasis is carried out by converting character color into a color other than black, for example red, and therefore all information except for lightness information is lost and on the contrary the emphasized part is weakened and becomes inconspicuous, thus causing problems.

SUMMARY OF THE INVENTION

The present invention has been made in view of the above circumstances and has as an object the provision of a document image processing device to solve the above-described problems.

A further object of the present invention is to provide a document image processing device for performing automatic conversion between a monochrome document and a color document.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the document image processing device of this invention comprises region segmentation means for segmenting a set of pixels in a document into a plurality of regions, character size distinction means for classifying the sizes of the characters in the region segmented by the region segmentation means, character image conversion means for converting characters of different sizes classified by the character size distinction means into color image based on information indicating correspondence between size and color of the character, and document image generation means for composing an image for an output document based on the image converted by the character image conversion means.

In a first embodiment of the document image processing device according to the present invention, region segmentation means segments an input image on a document into a character region, graphic region and so forth. Character size distinction means classifies regions belonging to the character region based on the size of those regions, in which a distinction criterion is determined by calculating an average size of those regions and the character size is distinguished in comparison with the distinction criterion. Character conversion means converts the image in each region classified by the character size distinction means into a color image employing a predetermined conversion method. The process of character conversion can be implemented by performing simple image processing such as region expansion, region contraction or color conversion. Document image generation means composes separated image data and generates new output image. By utilizing the first embodiment of the document image processing device according to the present invention, the monochrome document can be converted into color document which is impressive and highly effective.

In a second embodiment of the document image processing device according to the present invention, region segmentation means outputs result of division as a layout structure which is a hierarchical structure of constituents. Logical identifier assigning means assigns a logical name such as "title", "author" and "text" to each of the input layout structure of the document obtained by the region segmentation means. Character size distinction means finds the region in which character emphasis is carried out by changing character size from the layout structure data having the same logical identifier. In this process, a distinction criterion is determined based on an average value of size of characters having the same logical identifier, and character size distinction is performed by comparing character size with the distinction criterion. Character image conversion means converts an image in the region where character emphasis is carried out by changing character size into an image in which character is emphasized by changing color. The conversion process of the character image can be implemented by simple image processing such as region expansion, region contraction or color conversion. According to the second embodiment of the document image processing device of the present invention, the characters in layout structure having the same logical identifier emphasized by changing character size can be converted into characters emphasized by changing color; therefore emphasized parts in text, for example, can be distinguished and it is possible to perform careful conversion for character emphasis.

In a third embodiment of the document image processing device according to the present invention, color conversion means converts the input color density data values for blue (B), green (G) and red (R) for example, into toner signals for yellow (Y), magenta (M), cyan (C) and black (K). Character color distinction means classifies regions belonging to character region based on color. In this process, a distinction criterion is determined based on an average density value for each of Y, M, C and K of the region and the color of the character is distinguished by comparing density with the average density value. The other constituents of the structure function corresponding to those of the first embodiment. According to the third embodiment of the document image processing device of the present invention, in the case of converting a color document into a monochrome document, characters emphasized by color are converted into monochrome characters emphasized by changing sizes, thus preventing that the emphasized part is conversely lightened and becomes unnoticeable.

In a fourth embodiment of the document image processing device according to the present invention, character color distinction means finds a region where character emphasis is carried out by changing colors from the layout structure data values having the same logical identifier. In this process, a distinction criterion is determined based on an average density value for each of separated color components Y, M, C and K of a character having the same logical identifier and color of the character is distinguished by comparing the density of the character with the distinction criterion. The other constituents of the structure function corresponding to those of the first, second and third embodiments. According to the fourth embodiment of the document image processing device of the present invention, characters emphasized by color in the layout structure having the same logical identifier are converted into characters emphasized by changing their size or form in monochrome conversion, and therefore emphasized parts in text, for example, can be distinguished and it is possible to perform careful conversion for character emphasis.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

FIG. 8 shows examples of criteria for character size distinction;

FIG. 9 shows an example of a conversion table of a character image conversion module of the first embodiment of the document image conversion device according to the present invention;

FIG. 19 shows examples of a criteria for character color distinction;

FIG. 20 shows an example of a conversion table of a character image conversion module of the second embodiment of the document image processing device according to the present invention;

FIG. 26 shows the hierarchical structure which is the result of processing of the region segmentation module;

FIG. 27 shows an example of logical identifiers;

FIG. 29 shows correspondence between constituent numbers and logical identifiers;

FIG. 30 shows a result of processing of a logical identifier assigning module;

FIG. 31 shows an example of a criteria for character size distinction;

FIG. 32 shows a result of processing of character size distinction module;

FIG. 33 shows an example of a conversion table of the character image conversion module in the third embodiment of the document image processing device according to the present invention;

FIG. 34 shows a result of processing of character image conversion module in the third embodiment of the document image processing device according to the present invention;

FIG. 42 shows a hierarchical structure which is a result of processing of a region segmentation module in the fourth embodiment of the document image processing device according to the present invention;

FIG. 43 shows a result of processing of a logical identifier assigning module;

FIG. 44 shows an example of a criteria for character color distinction;

FIG. 45 shows a result of processing of a character color distinction module;

FIG. 46 shows an example of a conversion table of a character image conversion module; and FIG. 47 shows a result of processing of a character image conversion module.

DETAILED DESCRIPTION OF THE PREFERRED EMBODIMENTS

Preferred embodiments of a document image processing device according to the present invention are now described in detail based on the drawings.

First Embodiment

Figure 1:
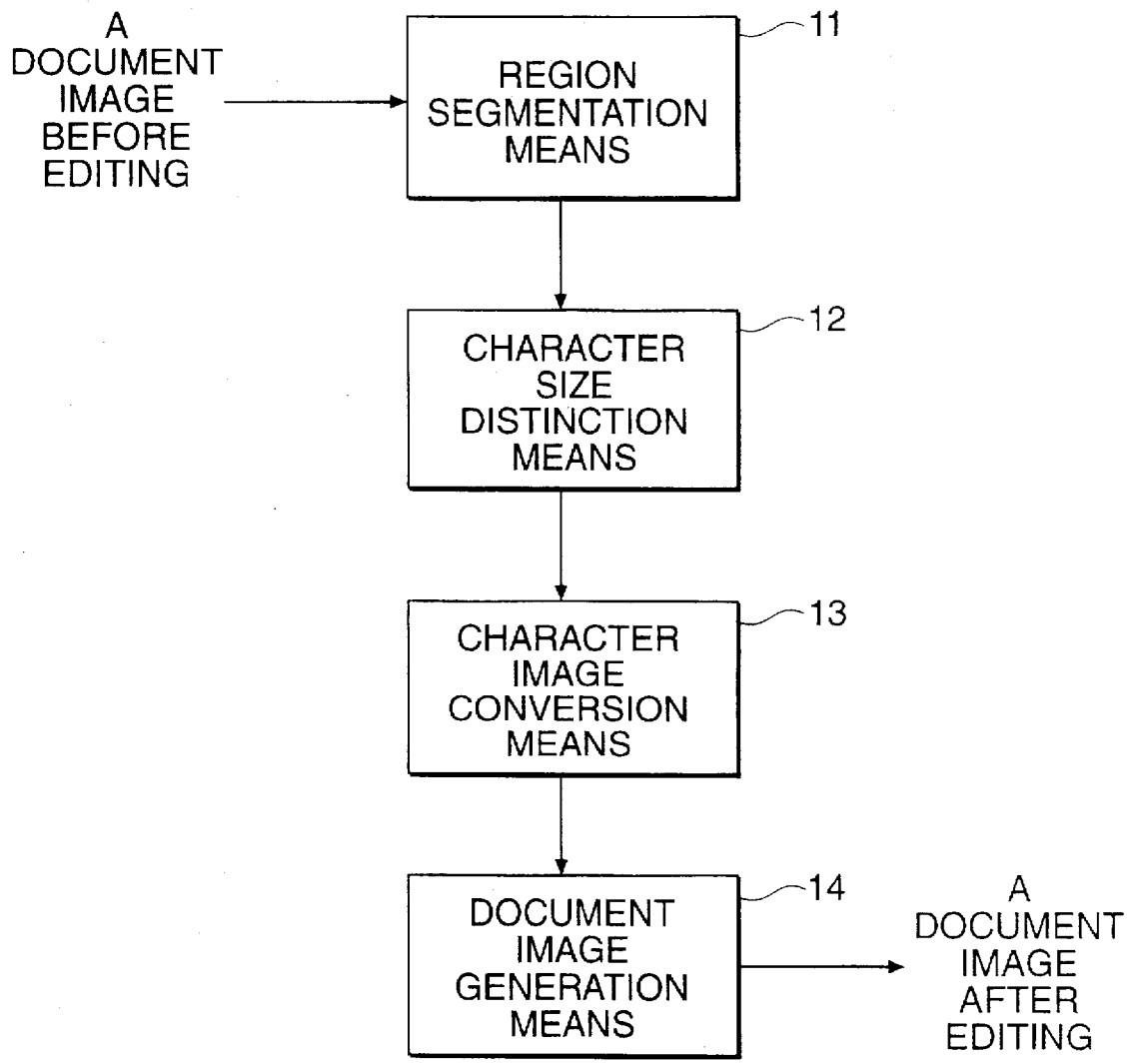
FIG. 1 shows the construction of a first document image processing device according to the present invention.
Figure 2:
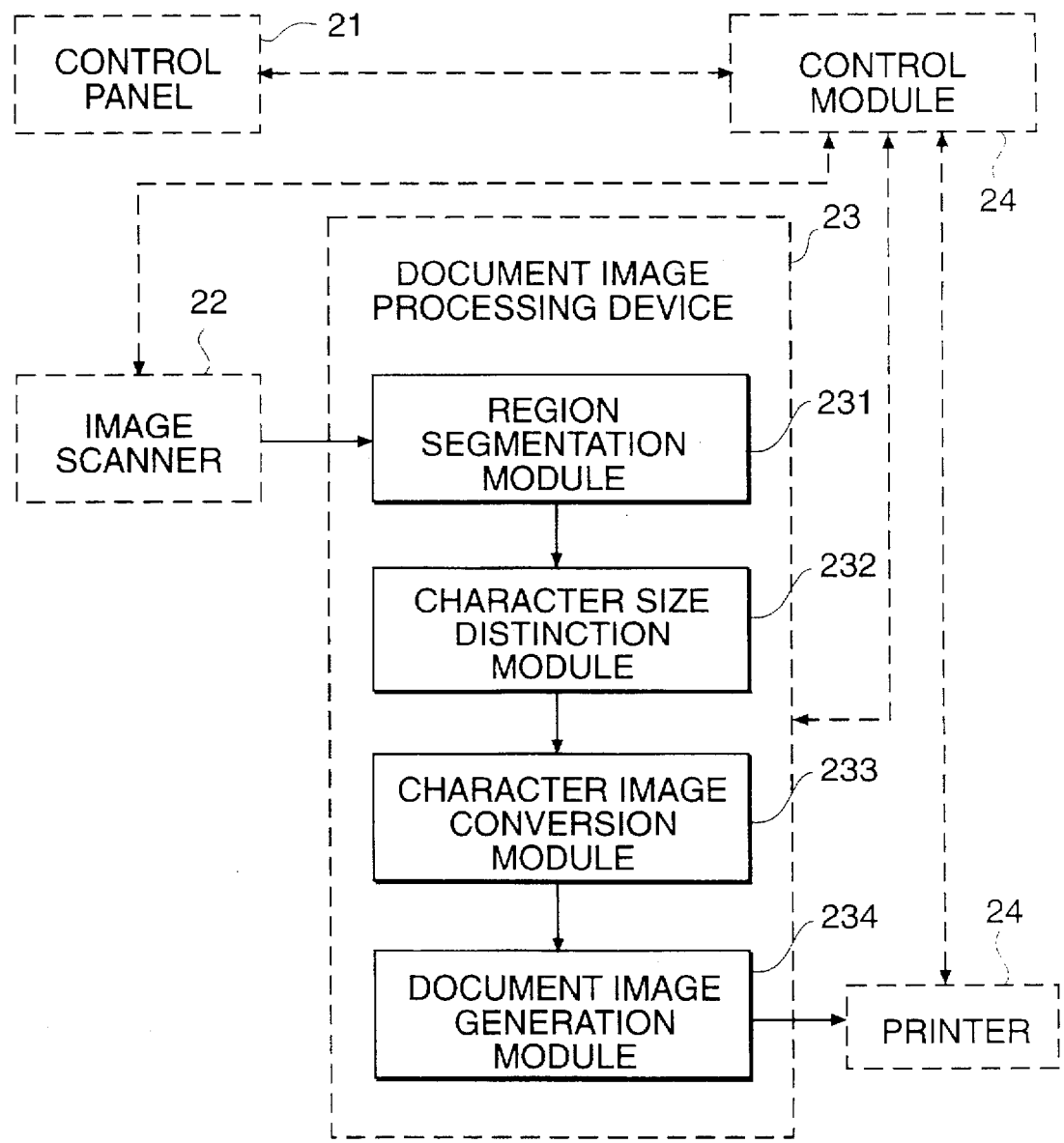
FIG. 2 shows a first embodiment which applies the first document image conversion device according to the present invention to a digital color copying machine.

FIG. 2 shows the construction of an embodiment which applies a document image processing device shown in FIG. 1 to a digital color copying machine.

Figure 3:
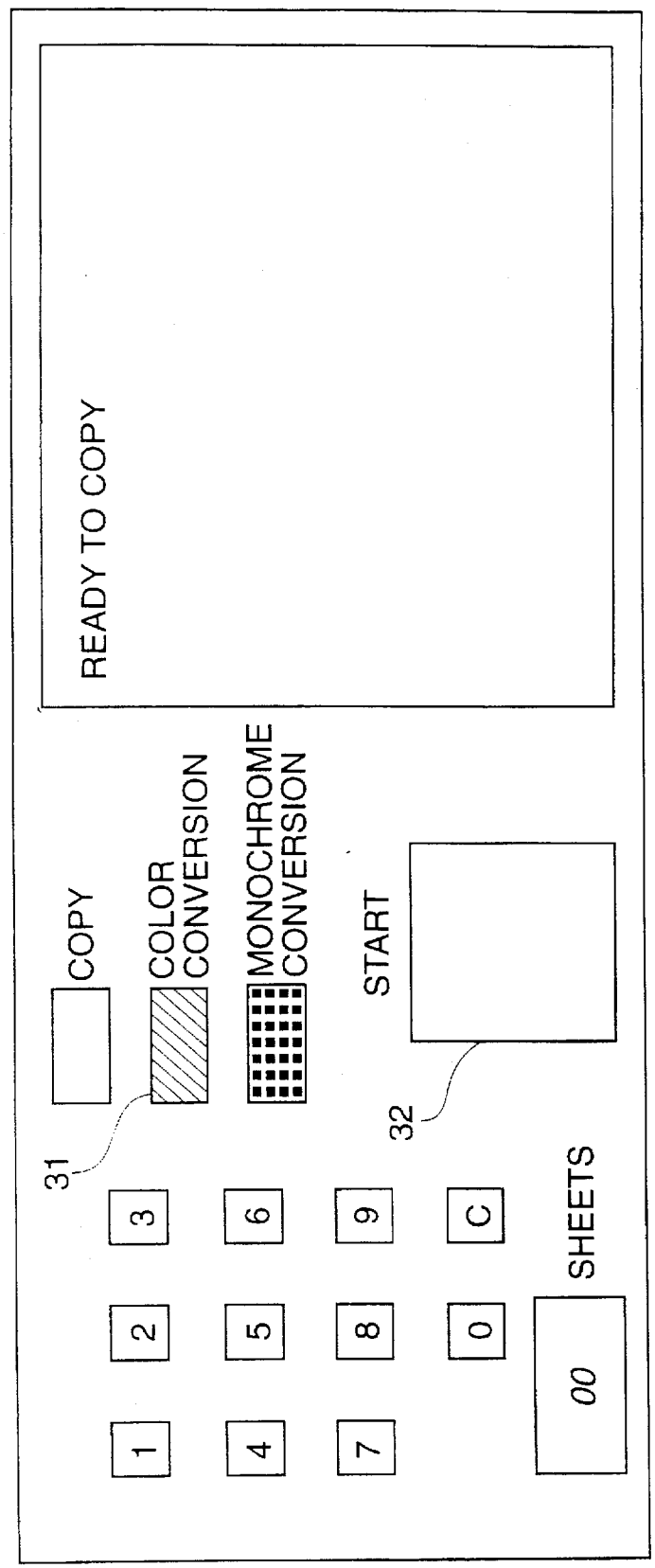
FIG. 3 show an example of a control panel of the first embodiment of the document image processing device according to the present invention.

The embodiment comprises a control panel 21 used for providing instructions for conversion by a user, an image scanner 22 for reading an image from a document, the document image processing device 23 according to the present invention, a printer 24 outputting a processed image on a sheet of paper and a control module 25 performing control of input/output of the control panel 21, start of the image scanner 22 and the printer 24, and so forth. FIG. 3 shows an example of the control panel.

The document image processing device 23 comprises a region segmentation module 231, a character size distinction module 232, a character image conversion module 233 and a document image generation module 234.

The region segmentation module 231 segments an input image on a document into character region, graphic region, and so forth, which corresponds to a region segmentation process in document recognition. This region segmentation process can be implemented by techniques already known, which are disclosed by Japanese Patent Application Unexamined Publication No. Sho. 64-15889 or Japanese Patent No. Sho. 61-32712, for example. The region segmentation module 231 segments each region into rectangles and outputs them. It is of course possible to carry out a pre-process such as correction of gradient or noise reduction before performing the region segmentation process. The regions segmented in this process are classified into characters, graphics, ruled lines and so forth, and output with their classifications.

The character size distinction module 232 is means for classifying regions belonging to a character region based on their size, which determines a distinction criterion based on an average value of the size of regions and distinguishes size of a region belonging to a character region in comparison with the criterion.

The character image conversion module 233 converts the, image in each region classified by the character size distinction module 232 into a color image by predetermined conversion method. The conversion process of character image can be implemented by simple image processing such as region expansion, region contraction or color conversion.

The document image generation module 234 composes separated image data to newly generate an output document image. This corresponds to a text layout process which relocates images segmented into characters so that they are arranged in a predetermined width, which can be implemented by an invention disclosed by Japanese Patent Application Unexamined Publication No. Hei. 3-122773 or Japanese Patent Application Unexamined Publication No. Hei. 5-266168, for example.

Operation of this embodiment with the above construction is now described.

Figure 4:
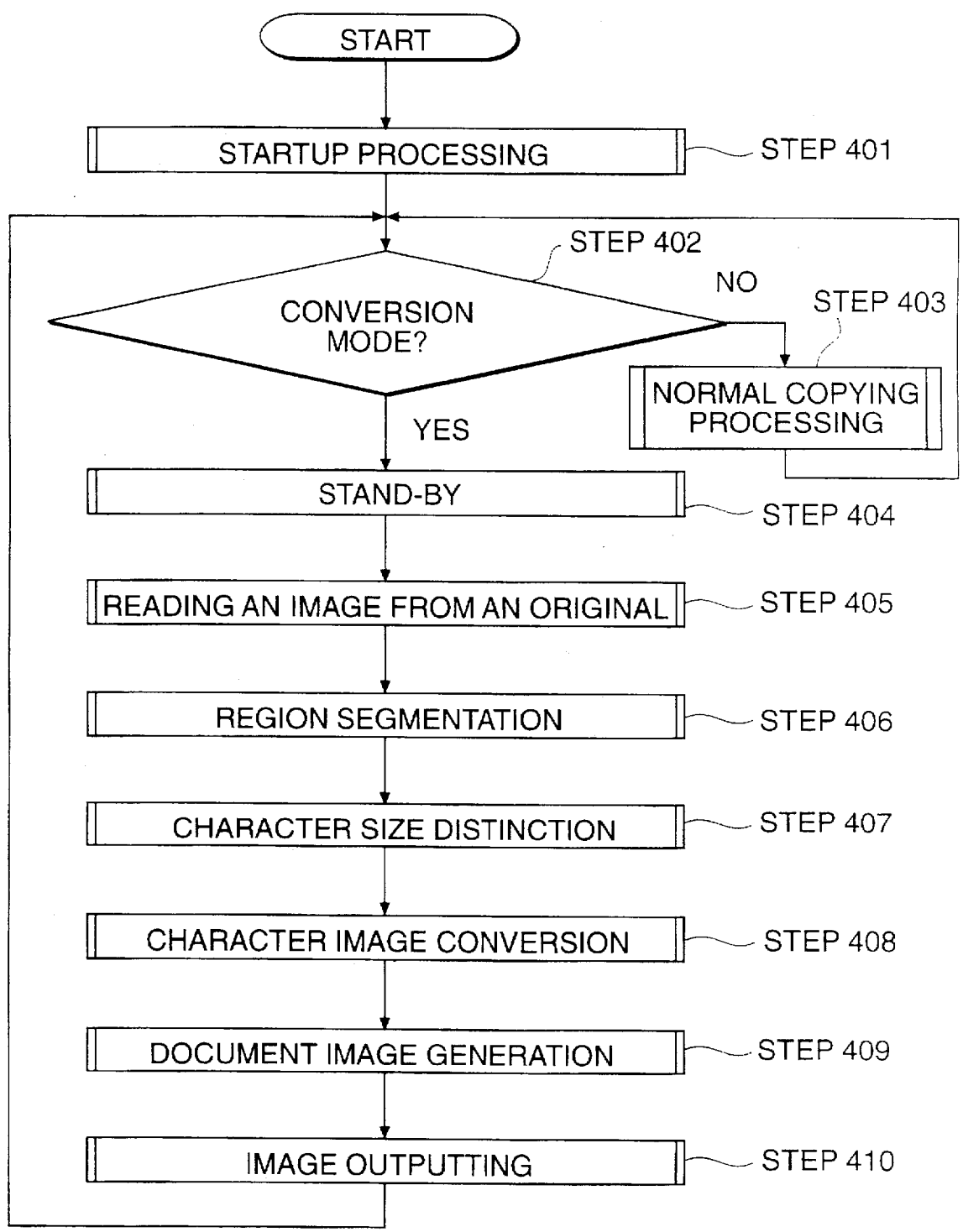
FIG. 4 is a flow chart showing processes of the first embodiment of the document image processing device according to the present invention.
Figure 5:
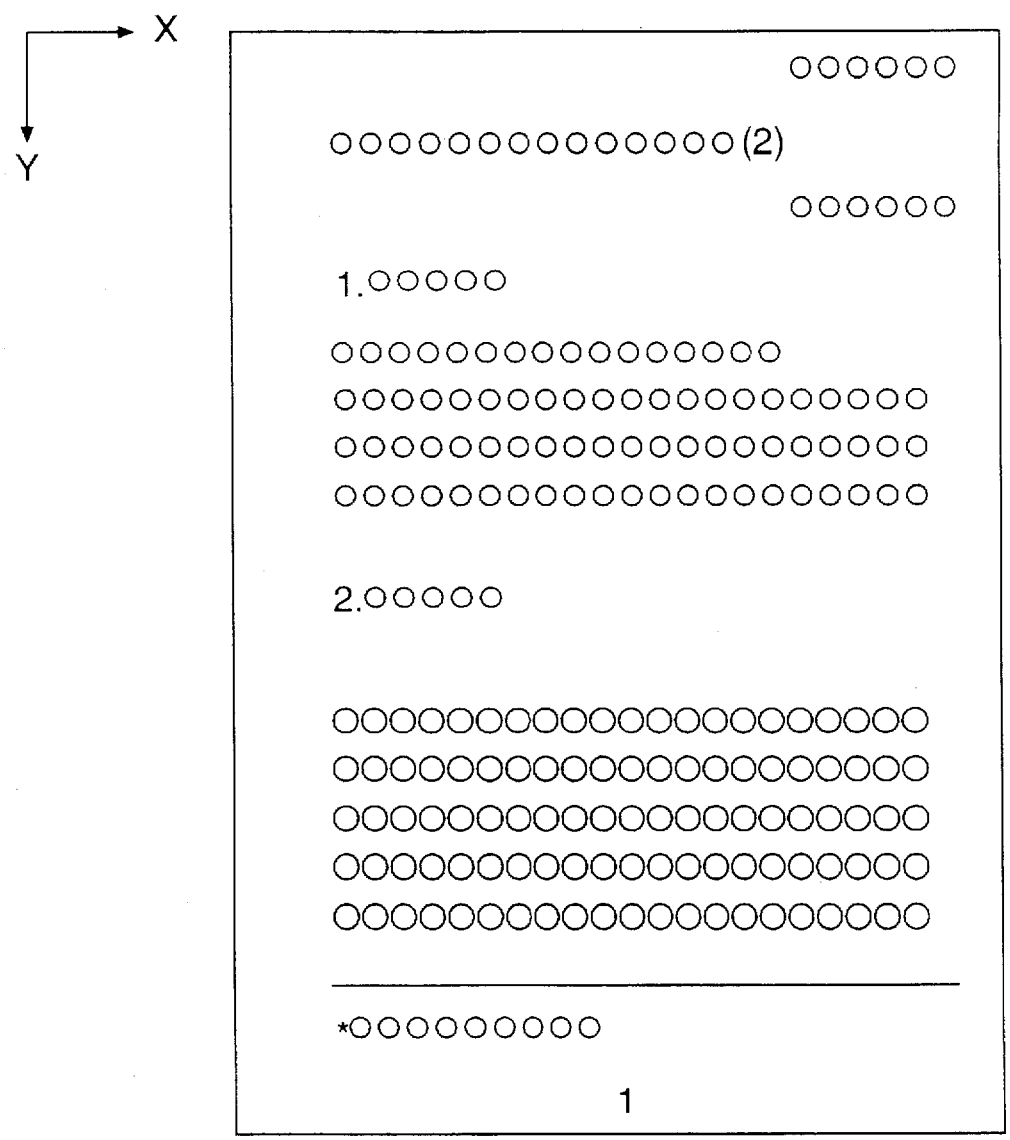
FIG. 5 shows an example of a document to be input in the first embodiment of the document image processing device according to the present invention.

FIG. 4 is a flow chart showing the process. FIG. 5 is an example of monochrome input document. The following description of operation employs an example of converting the document shown in FIG. 5 into a color document. As shown in FIG. 5, the x-axis of the coordinates is in right direction of the space and the y-axis is in downward direction of the space.

After the power supply is provided, the control module 25 carries out a startup process (step 401) and an initial image is displayed. With a press of "color conversion" button 31 on the control panel 21 by the user, a color conversion mode is selected; otherwise normal copying process is carried out (step 403). After the color conversion mode is employed, the machine is on stand-by for the press of "start" button 32 (step 404).

The user puts a document on a platen and presses the "start" button 32, then the control module 25 starts the image scanner 22 to read an image from the document as a digital image (step 405) and transmit it to the region segmentation module 231.

Figure 6:
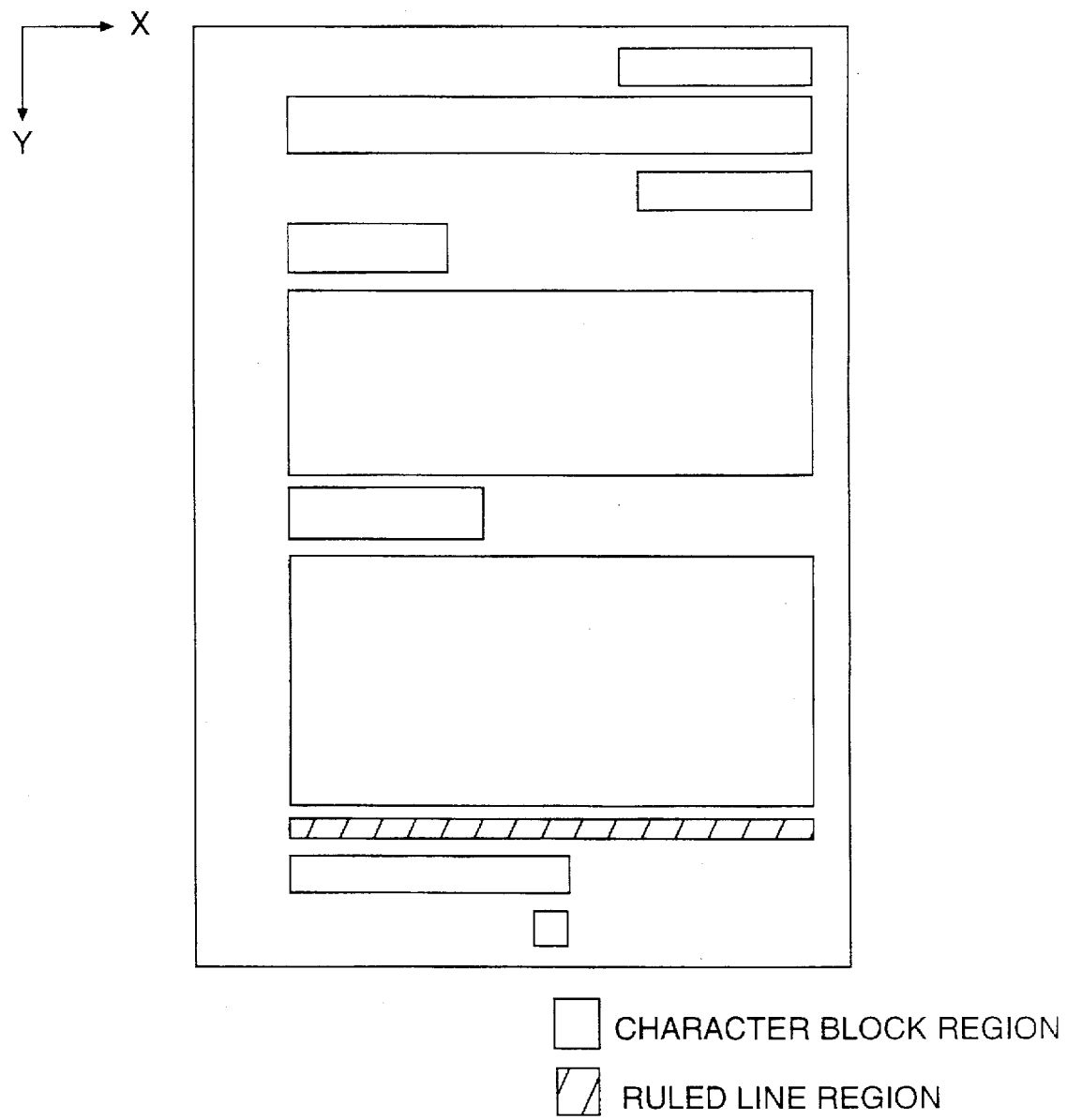
FIG. 6 shows a result of processing by a region segmentation module.
Figure 7:
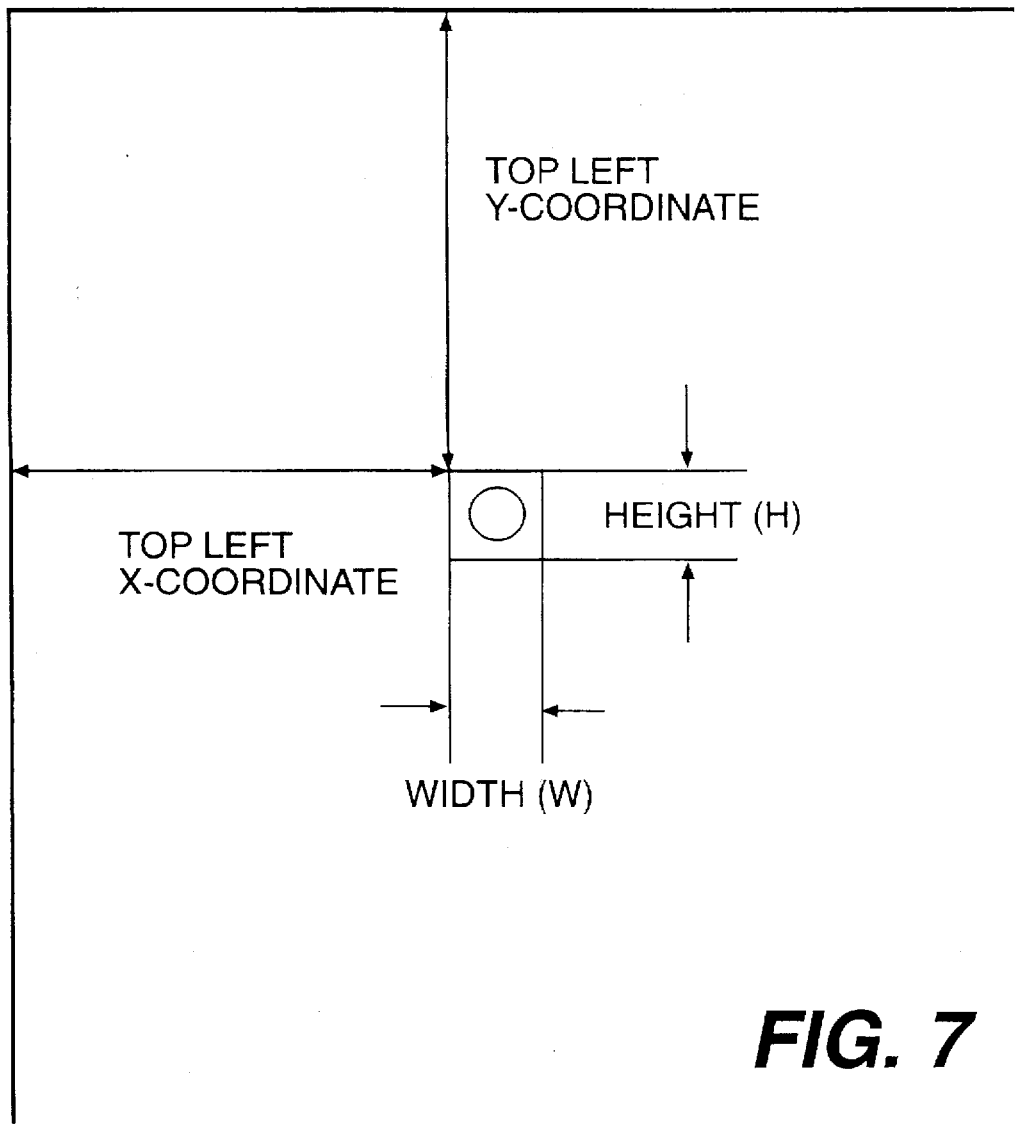
FIG. 7 shows an example of a segmented region.

By processing of the region segmentation module 231, the input image shown in FIG. 5 is segmented into regions in which characters are arranged in blocks (character block regions), regions including ruled lines, and the other (blank) regions as shown in FIG. 6 (step 406). The rectangle representing a region has sides parallel to x and y directions in the document and is a smallest rectangle surrounding an object region. Data for the region is represented by a set of classification, top left x-coordinate, top left y-coordinate, width (w) and height (h). FIG. 7 is an example of a segmented region.. The data is transmitted to the character size distinction module.

The character size distinction module 232 distinguishes a region whose classification is character based on their size (step 407). Based on an average value of size of characters, a distinction criterion (a threshold level) is determined and large characters and small characters are distinguished by comparing with the threshold level. FIG. 8 shows examples of the distinction criteria. In this figure, regions are distinguished based on the height of the rectangle: for example, the regions are classified based on whether its height is less than ×0.9 magnification of the average height of the rectangles, ×0.9 or more and less than ×1.1, ×1.1 or more and less than ×1.5, or ×1.5 or more. However, it is not necessary to employ the height of rectangle for the distinction and whatever index showing size of the rectangle such as width or area of the rectangle may be used. Heights of rectangles are widely different from each other; therefore distinction is carried out per block unit by comparing an average value of the block with the distinction criterion. The result of the distinction is transmitted to the character image conversion module.

The character image conversion module 233 converts bitmap data values of a monochrome image into pixmap data values of a color image (step 408). FIG. 9 is an example of a conversion table for the classifications shown in FIG. 8, which is stored in ROM, for example, in advance. In FIG. 9, "size" represents the ratio of the block size to the size of the average character size. Plural conversion tables can be prepared and the user may give instructions for the machine to switch the tables. The converted image data is transmitted to the document image generating module.

The document image generating means allocates each of the image data values of C, M, Y and in a layout structure data to the space by character allocation process and generates an ultimate image to be output (step 409). After completion of generation of the image on the output document, the control module 25 starts the printer 24, thus providing a legible output document including a title, catchword, author or the like emphasized by coloring (step 410).

Second Embodiment

Figure 11:
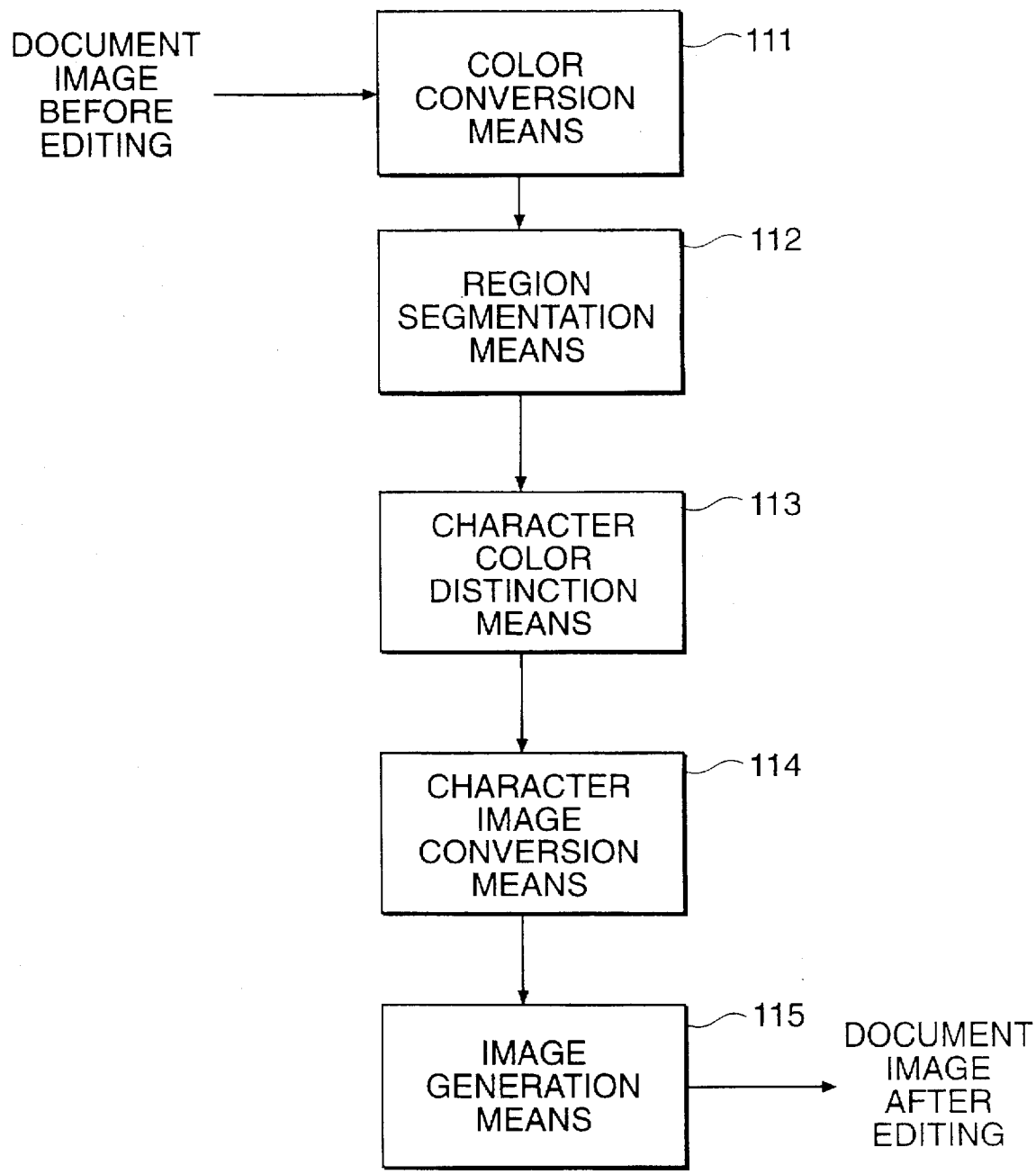
FIG. 11 shows the construction of a second document image conversion device according to the present invention.
Figure 12:
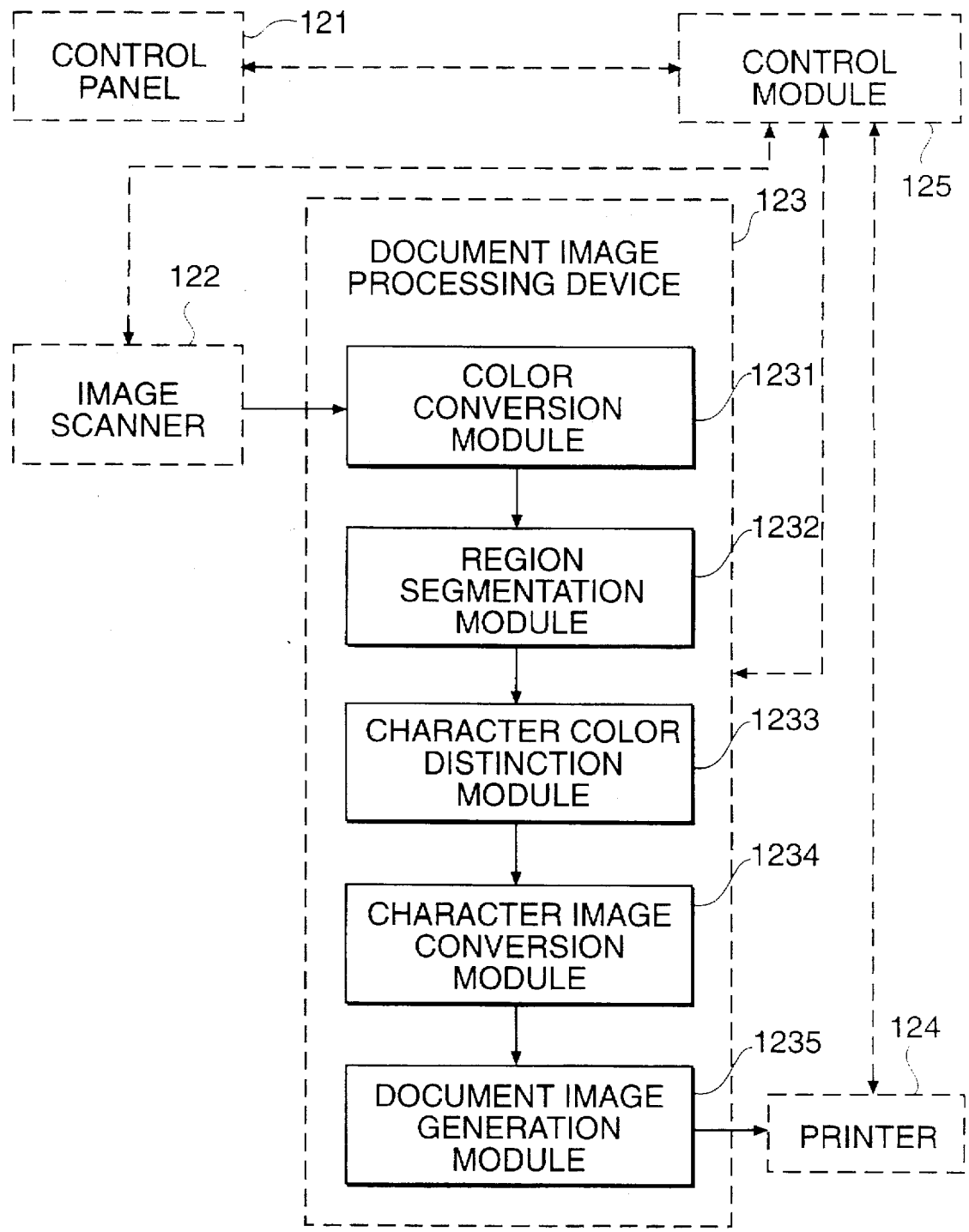
FIG. 12 shows the construction of a second embodiment which applies the second document image conversion device according to the present invention to a digital color copying machine.

FIG. 12 shows the construction of an embodiment which applies a document image processing device according to the present invention shown in FIG. 11 to a digital color copying machine. A control panel 121 is means for giving instruction of conversion by the user and a control module 125 is means for controlling input/output of the control panel 121, start of an image scanner 122, start of a printer 124 and so forth. The document image processing device 123 comprises a color conversion module 1231, a region segmentation module 1232, a character color distinction module 1233, a character image conversion module 1234 and a document image generation module 1235.

The color conversion module 1231 converts input color density data values of B, G, and R into toner signals of yellow (Y), magenta (M), cyan (C) and black (K). During the conversion, various data processing such as density adjustment, contrast adjustment, color balance adjustment or the like may be performed to improve reproducibility of color, gradation or preciseness.

The character color distinction module 1233 classifies regions belonging to a character region based on color. A distinction criterion is determined based on an average value for each of C, M, Y and K in a region and the color of the character is distinguished by comparing density with the distinction criterion.

The other constituents are the same as those of the first embodiment.

Figure 13:
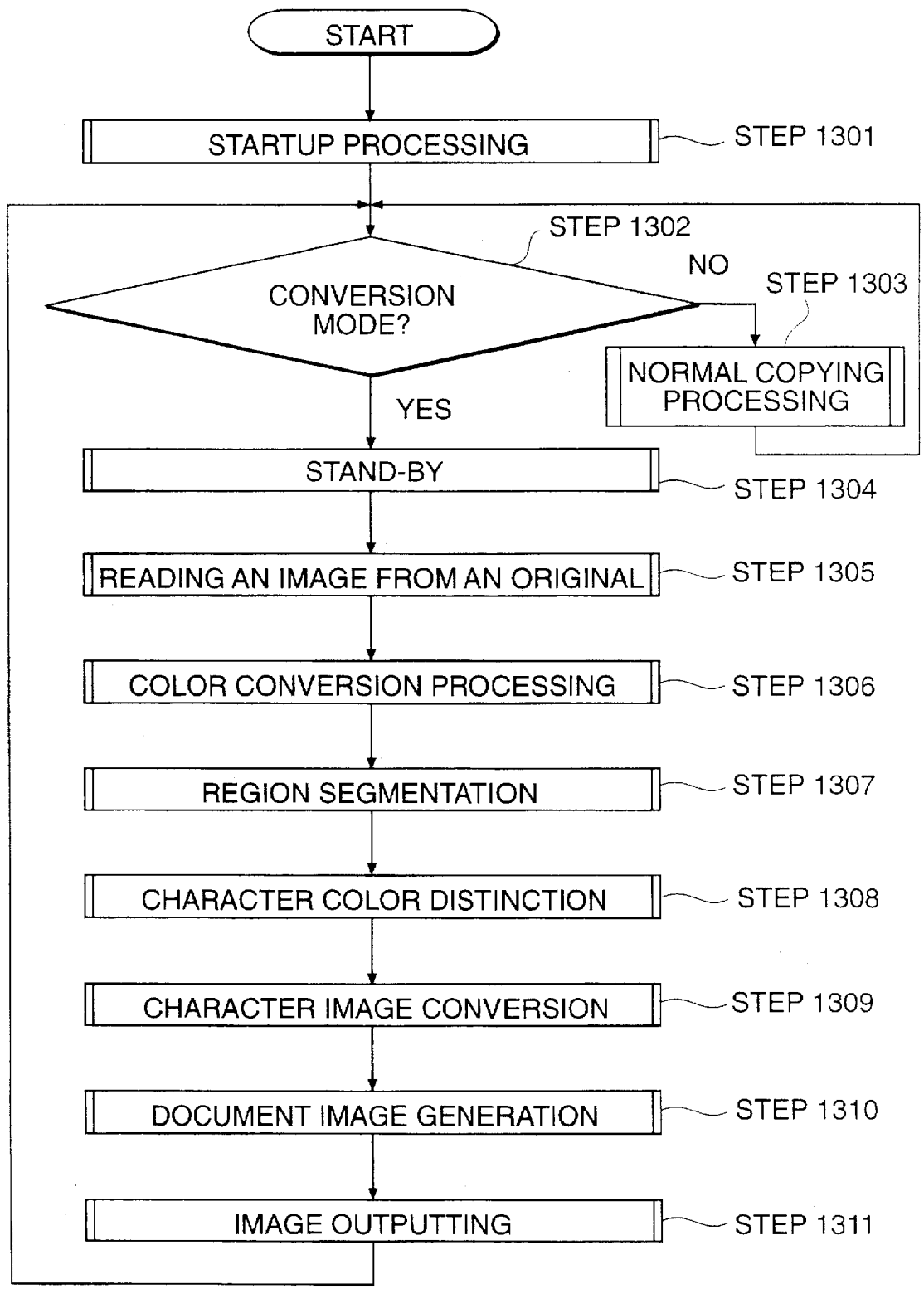
FIG. 13 is a flow chart showing processes of the second embodiment of the document image conversion device according to the present invention.
Figure 14:
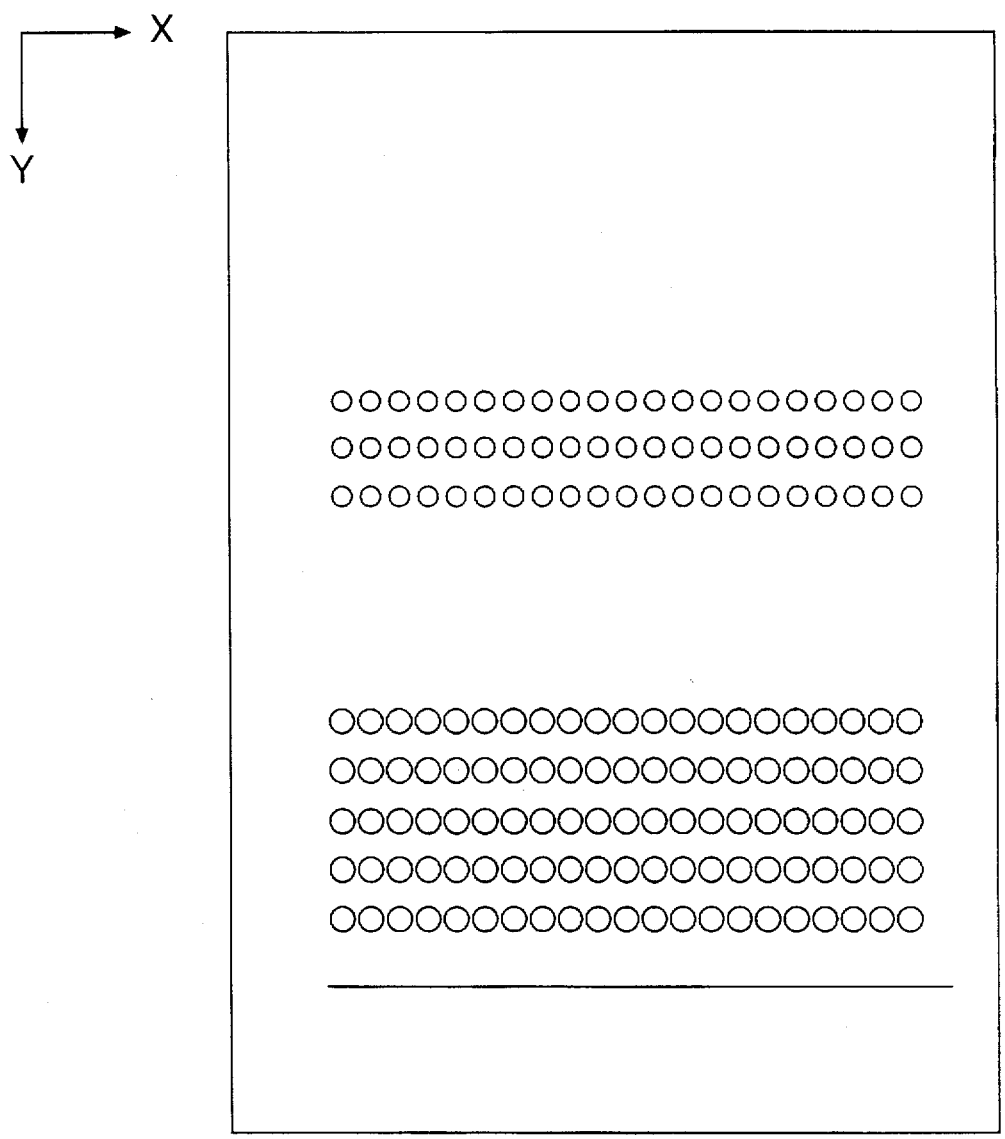
FIG. 14 shows an example of a document image of K, which is one of separated color component images in the second embodiment of the document image processing device according to the present invention.
Figure 15:
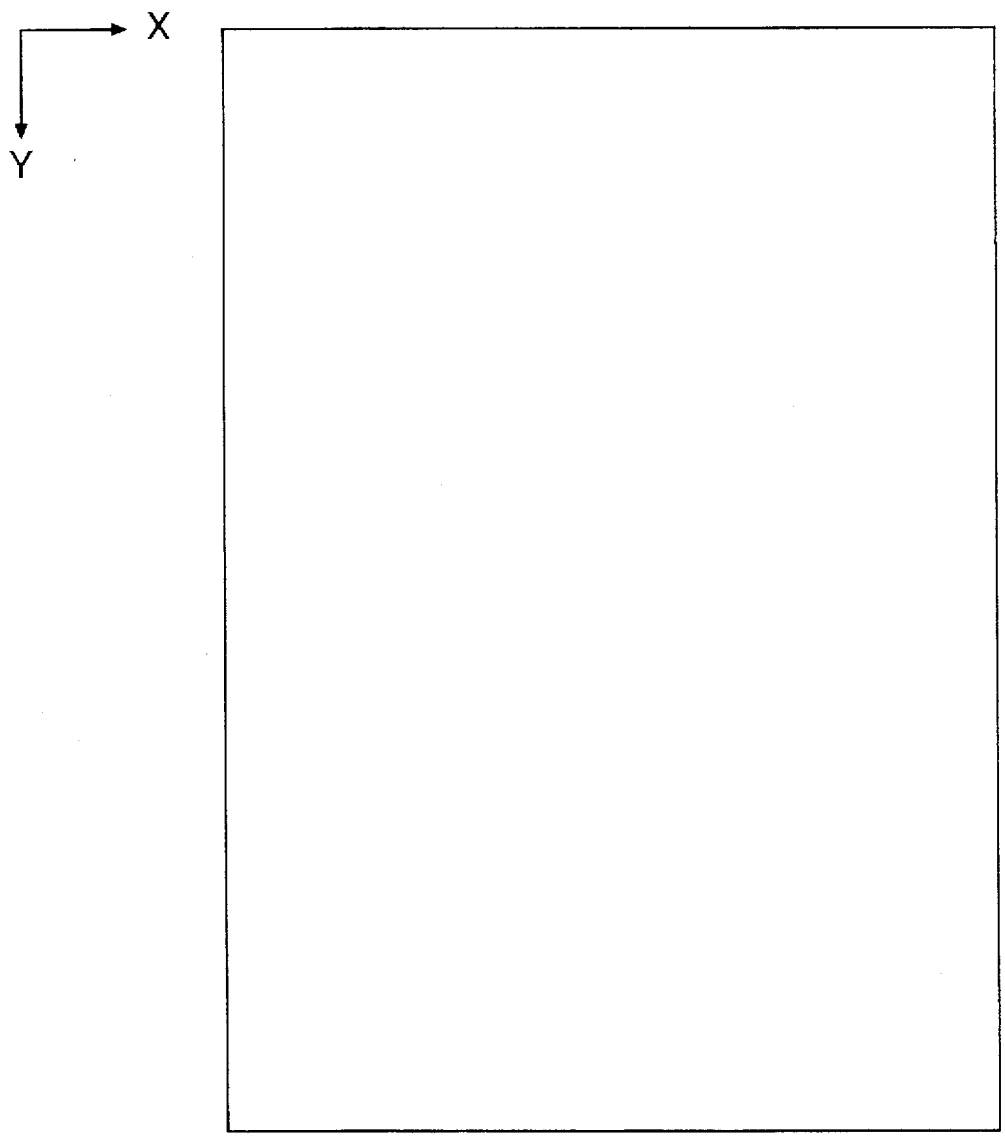
FIG. 15 shows an example of a document image of M, which is one of separated color component images in the second embodiment of the document image processing device according to the present invention.
Figure 16:
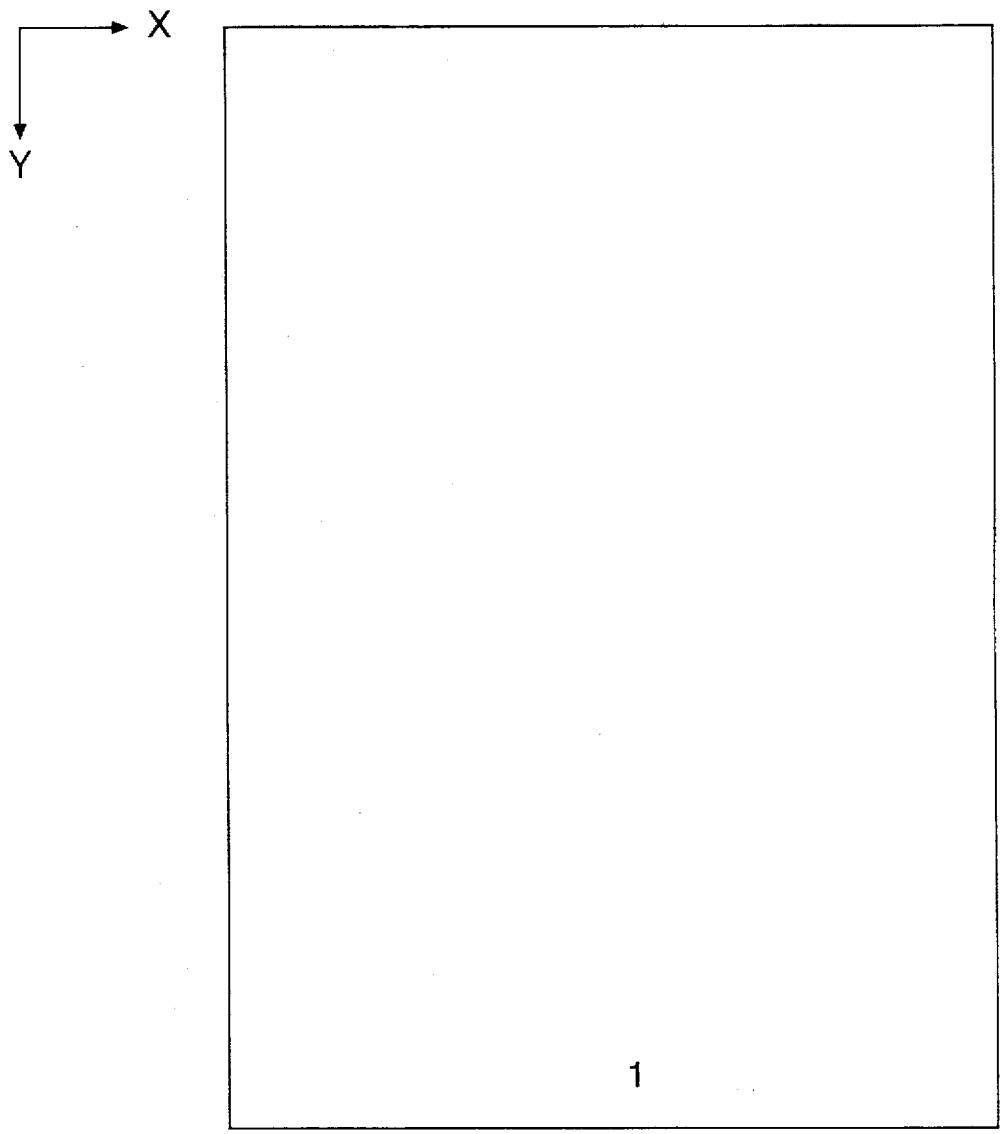
FIG. 16 shows an example of a document image of Y, which is one of separated color component images in the second embodiment of the document image processing device according to the present invention.
Figure 17:
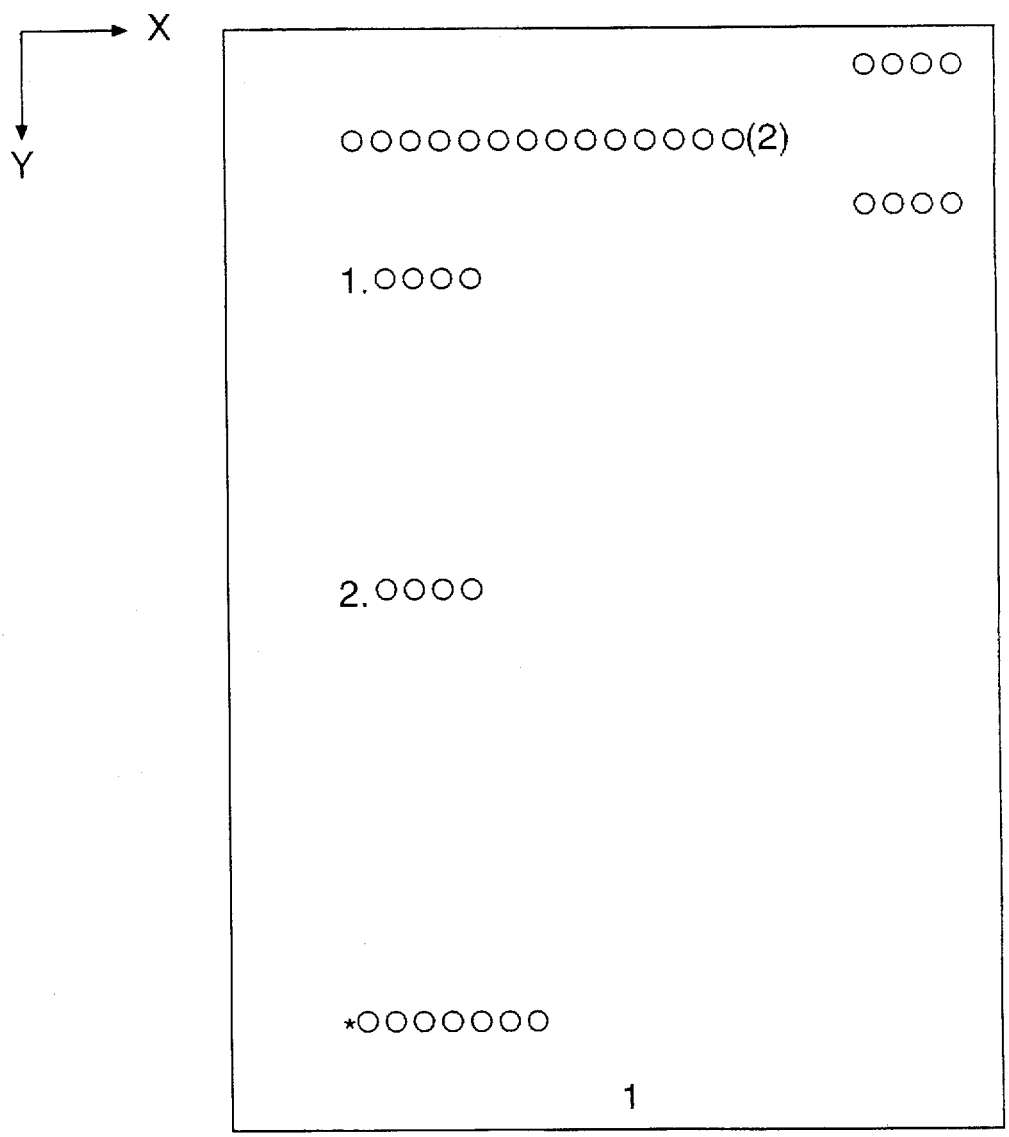
FIG. 17 shows an example of a document image of C, which is one of separated color component images in the second embodiment of the document image processing device according to the present invention.

Operation of the second embodiment constructed as described above is as follows. FIG. 13 is a flow chart of processing. In contrast with the first embodiment, operation of this embodiment will be described taking an example of converting a color document shown in FIG. 10 into a monochrome document. As same as the first embodiment, the x-axis of the coordinates extends in right direction of the space and the y-axis extends in downward direction of the space.

Being provided the power supply, the control module 125 carries out a starting process (step 1301) and an initial image plane is displayed on the control panel 121. If the user presses a "monochrome conversion" button on the control panel 121, a monochrome conversion mode is selected; otherwise a normal copying process is carried out (step 1303). After the monochrome conversion mode is selected, the machine is on stand-by for the press of the "start" button (step 1304).

The user puts a document on the platen and presses the "start" button, and then the control module 125 starts the image scanner 122 to read an image from the document as digital images of B, G and R, for example (step 1305), and transmits them to the color conversion module 1231.

The color conversion module 1231 converts the color density data values for B, G and R into toner signals of C, M, Y and K (step 1306). If the document shown in FIG. 10 includes only color components C and K, converted image data values are such as shown in FIGS. 14 through 17. These data values are transmitted to the region segmentation module 1232.

Figure 10:
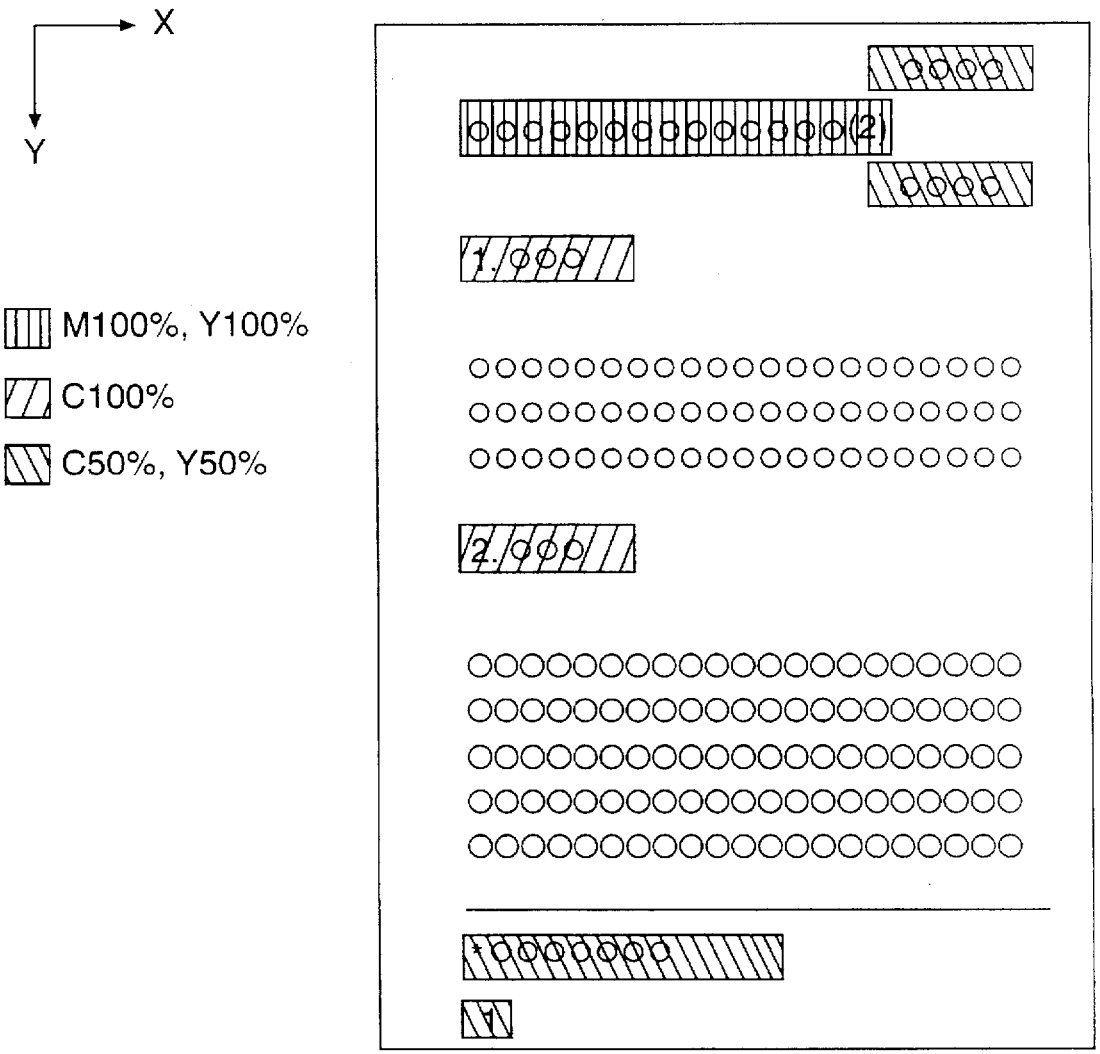
FIG. 10 shows an example of a document output from the first embodiment of the document image conversion device according to the present invention.
Figure 18:
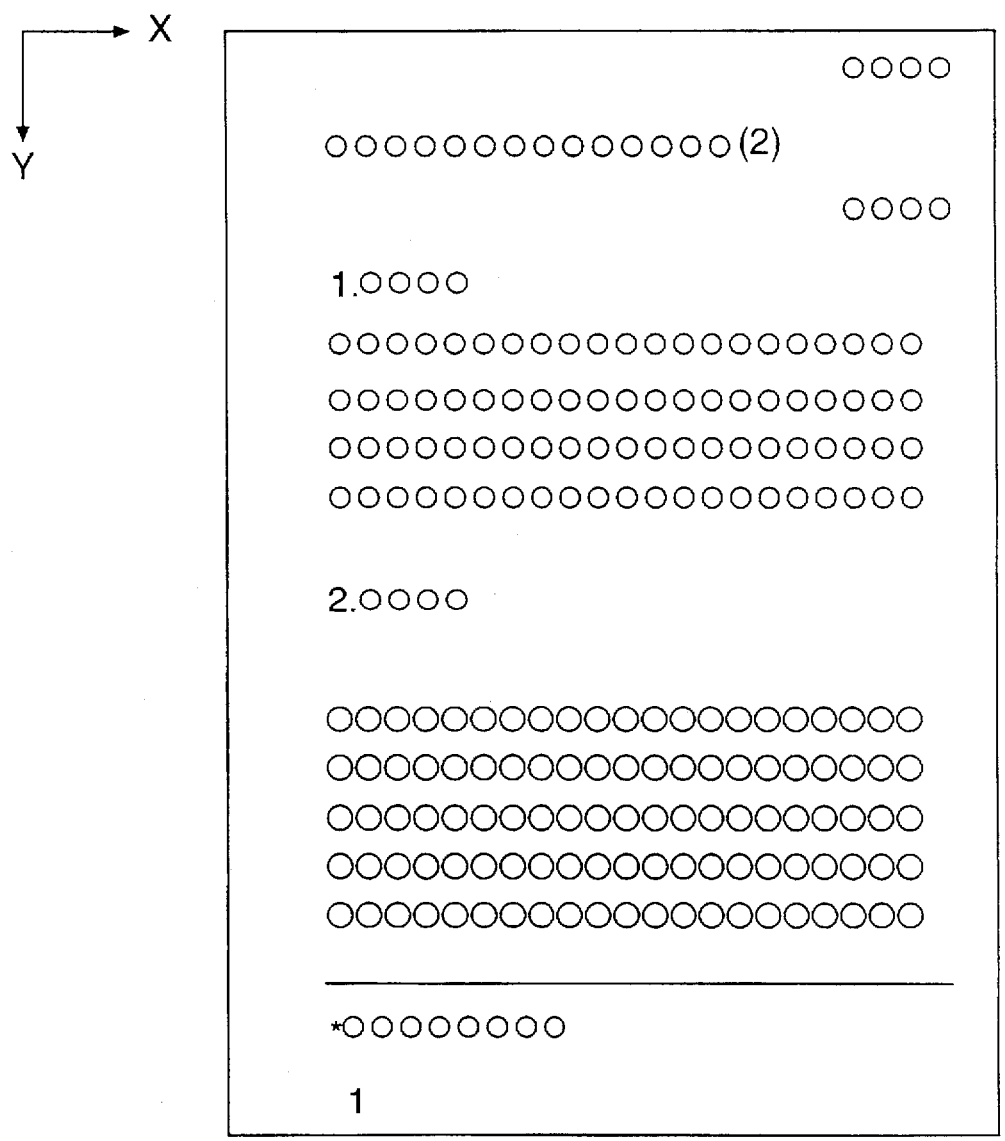
FIG. 18 shows an example of a recomposed document image after separating into color component images.

The region segmentation module 1232 first ORs data values of different color component images obtained by the color conversion module and forms image data shown in FIG. 18. Use of the image data makes it possible to carry out region segmentation by the process similar to the region segmentation process in the first embodiment (step 1307). As a result, the input color image shown in FIG. 10 is segmented into a region where characters are arranged in block, a region including ruled lines and other (blank) regions. The segmented data values are transmitted to the character color distinction module 1233.

The character color distinction module 1233 distinguishes regions whose classifications are characters based on the color. A distinction criterion (threshold level) is determined based on an average density of the color of the character and the color of the character is distinguished by comparing with the threshold level (step 1308). FIG. 19 shows an example of a density as the threshold level for distinction, which is 10% higher than the average density. In this embodiment, each of colors Y, M and C is classified into two types by comparison as to whether its density is higher or lower than the threshold level, that is, colors are classified into 8 types in total. The classified data values are transmitted to the character image conversion module 1234.

The character image conversion module 1234 converts each of the regions into a monochrome image of the size corresponding to the distinguished density in accordance with the classification of the character color distinction module 1233. FIG. 20 is an example of a conversion table for each classification shown in FIG. 19 and it is stored in the ROM for example, in advance. The "size" shown in the table represents the ratio of the converted character size to the average character size. It is possible to prepare plural conversion tables and switch them in accordance with the direction by the user. The converted image data is transmitted to the document image generation module 1235.

The document image generation module 1235 allocates data values of the image in the regions to the space of paper by text layout processing and forms an image of an ultimate output document (step 1310). On completing formation of the image of the output document, the control module 125 starts the printer 124, whereby the output document as shown in FIG. 5 can be obtained (step 1311).

Third embodiment

Figure 21:
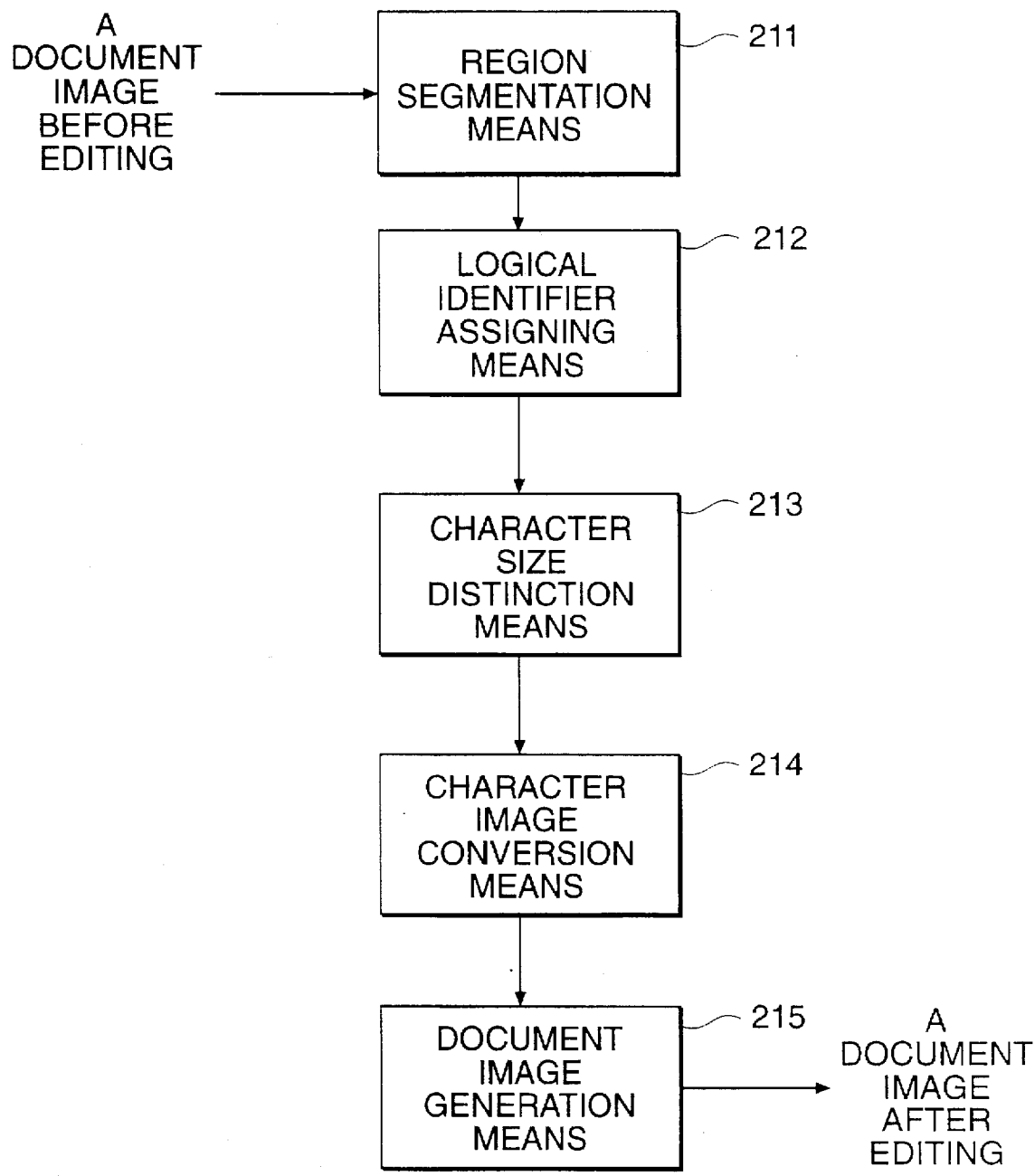
FIG. 21 shows the construction of a third document image processing device according to the present invention.
Figure 22:
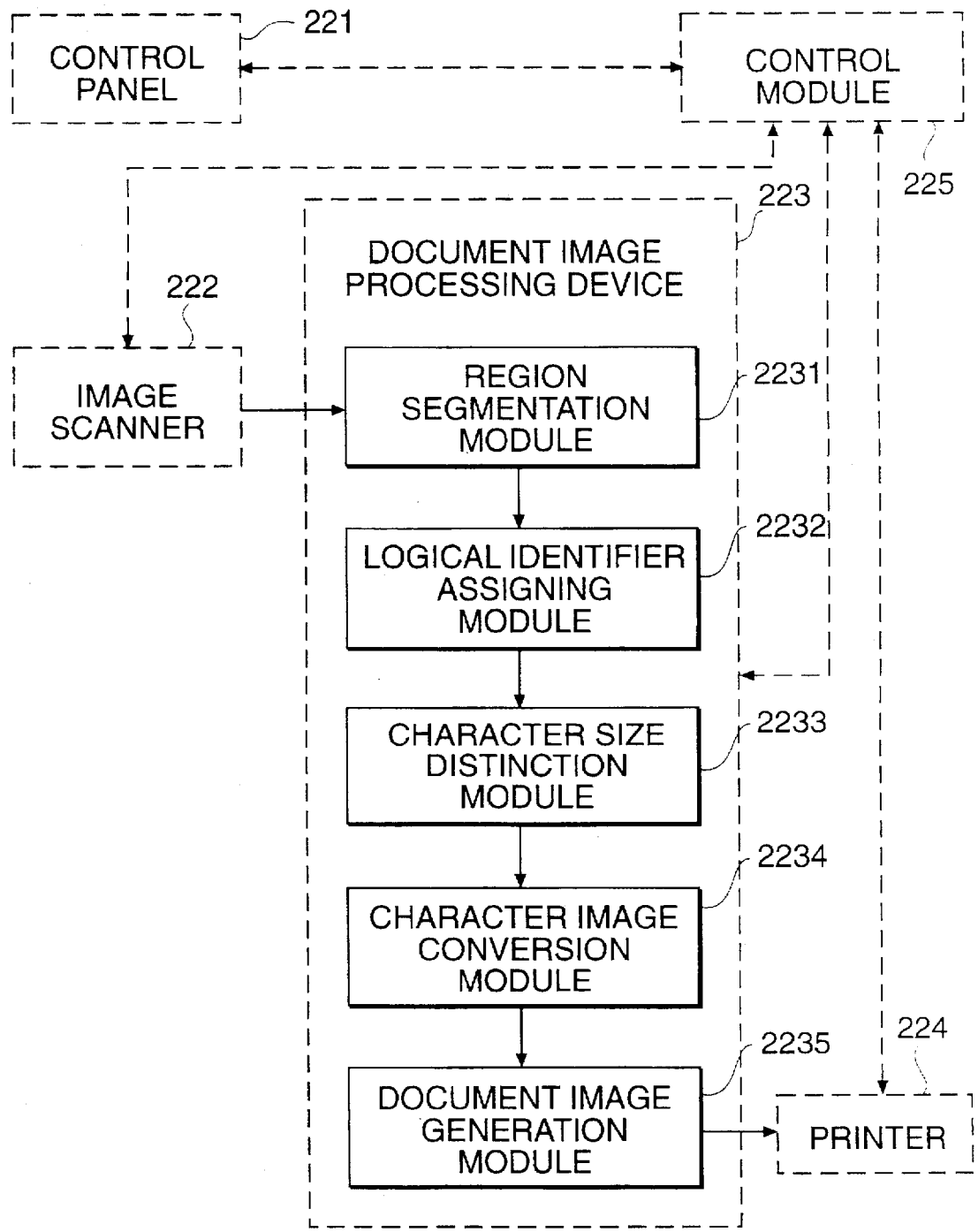
FIG. 22 shows the construction of a third embodiment which applies the third document image processing device according to the present invention to a digital color copying machine.

FIG. 22 shows the construction of a third embodiment which applies a document image processing device according to the present invention shown in FIG. 21 to a digital color copying machine.

A region segmentation module 2231 of the third embodiment outputs a result of division as a hierarchical structure of constituents, which is referred to as a layout structure.

A logical identifier assigning module 2232 assigns logical names such as "title", "author" and "text" as identifiers to input layout structure of a document obtained by the region segmentation module 2231. This is implemented by a method of recognition of logical structure of a document and contents of the document and an apparatus thereof, disclosed by Japanese Patent Application Unexamined Publication No. Hei. 5-159101. In this method, a structure model representing correspondence between the layout structure of an object of recognition and a logical structure is stored in advance, and assigns identifiers indicating logical names to both of them by a match of the result of the region segmentation and the structure model.

A character size distinction module 2233 is means for detecting a region in which a character is emphasized by changing size from data values of layout structure having the same logical identifiers. A distinction criterion is determined based on the average size of characters having same logical identifiers and the character size is distinguished by comparing with the distinction criterion.

A character image conversion module 2234 converts an image in the region in which characters are emphasized by changing size into an image in which characters are emphasized by coloring by a predetermined conversion method. The conversion process of the character image can be implemented by simple image processing such as region expansion, region contraction or color conversion. The other constituents of the third embodiment are the same as those of the first embodiment.

Figure 23:
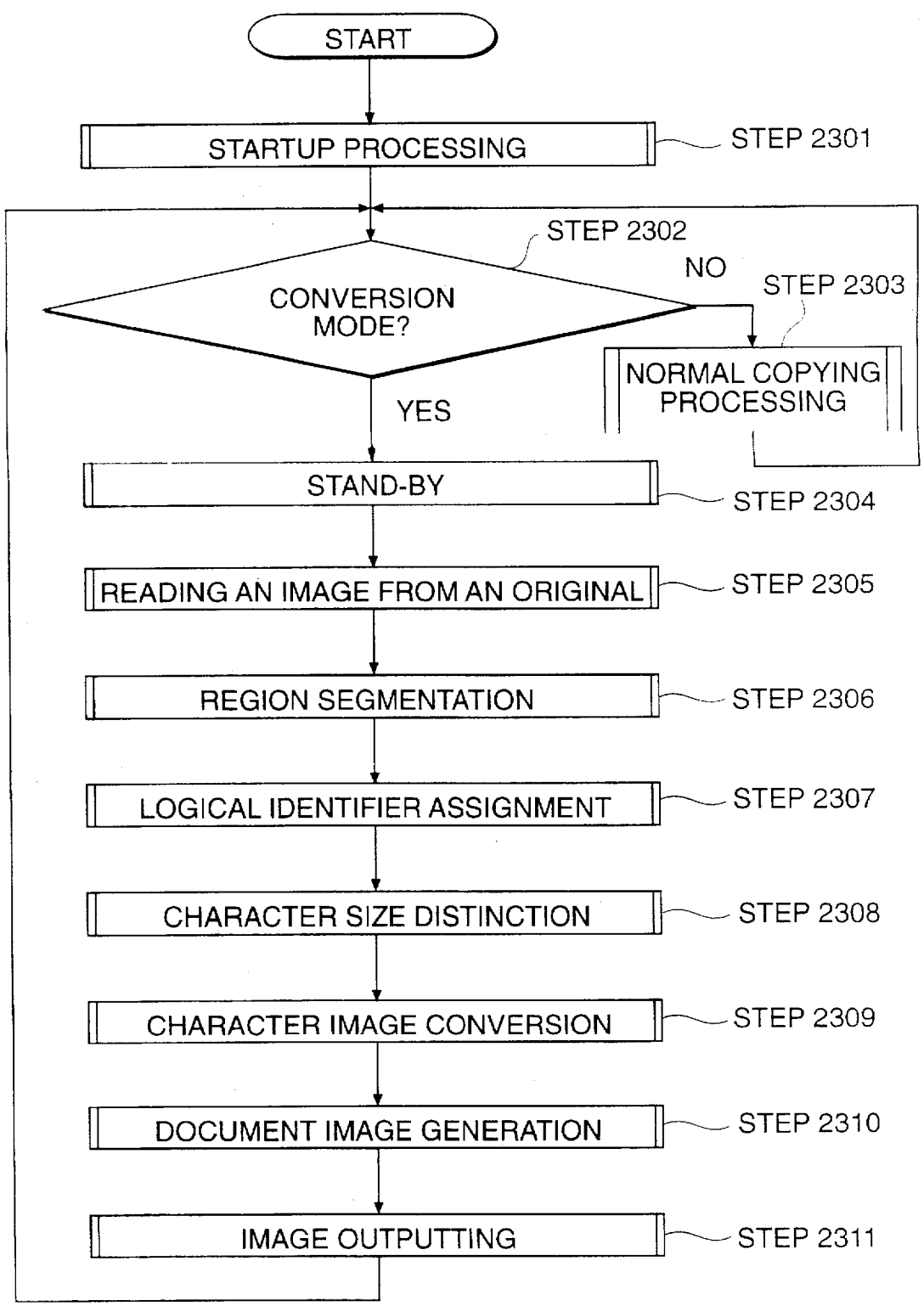
FIG. 23 is a flow chart showing processes of the third embodiment of the document image processing device according to the present invention.
Figure 24:
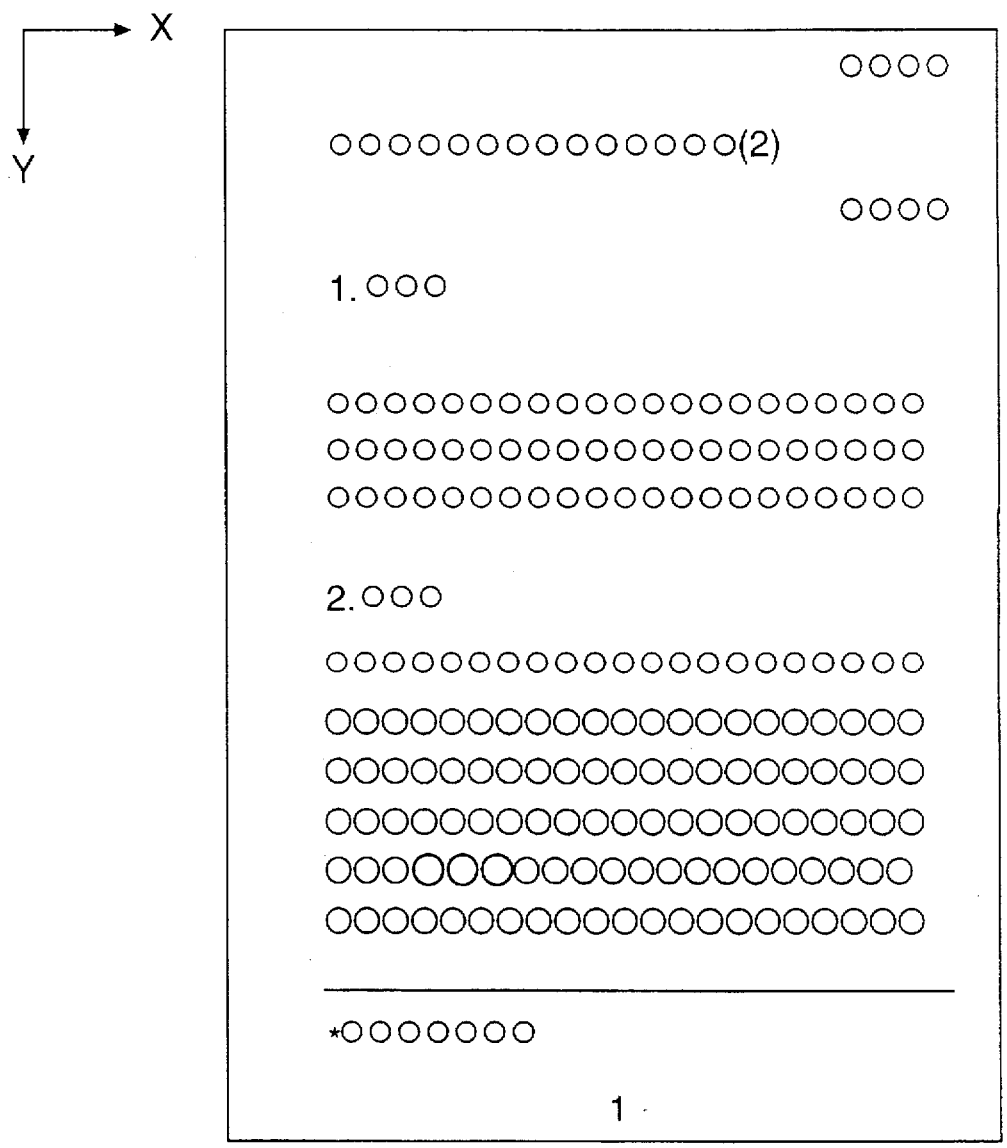
FIG. 24 shows an example of a document input to the third embodiment of the document image processing device according to the present invention.

FIG. 23 is a flow chart showing processing of the third embodiment. FIG. 24 shows a monochrome document to be input, and the operation of the embodiment will be described taking this document as an example for color conversion. As shown in FIG. 24, the x-axis of the coordinates extends in right direction of the space and the y-axis extends in downward direction of the space.

Being provided the power supply, the control module 225 carries out the startup process (step 2301) and display an initial image on the control panel. If the user presses "color conversion" button on the control panel, a color conversion mode is selected; otherwise a normal copying process is carried out (step 2303). After the color conversion mode is selected, the machine is on stand-by for the press of "start" button (step 2304).

If the user puts the document on the platen and presses the "start" button, the control module 225 starts the image scanner 222 to read an image from the document as a digital image, and it is transmitted to the region segmentation module 2231.

Figure 25:
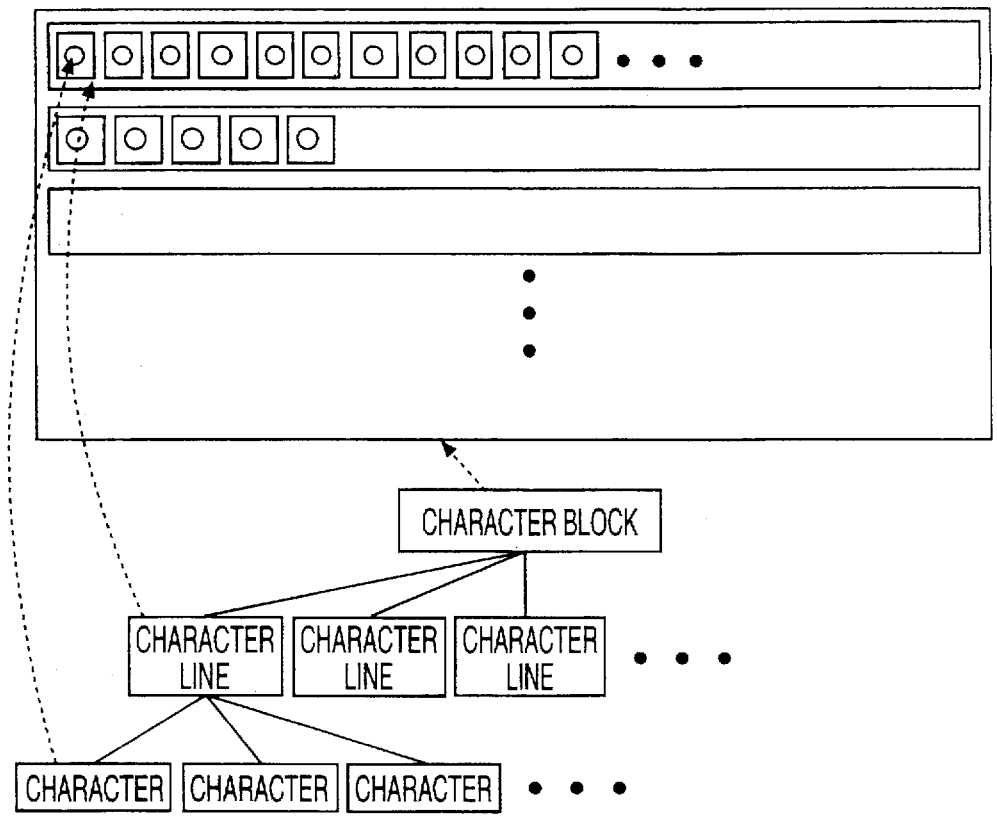
FIG. 25 shows correspondence between hierarchical structure which is a result of processing of the region segmentation module and example of the input document.

By processing of the region segmentation module 2231, the input image shown in FIG. 24 is segmented into a region where characters are arranged in block, a region including ruled lines and other (blank) regions (step 2306). The rectangle representing a region has sides parallel to x and y directions in the document and is a smallest rectangle surrounding an object region. Data for the region is basically represented by a set of classification, top left x-coordinate, top left y-coordinate, width (w) and height (h). Moreover, a hierarchical structure is formed so that, in the case of the character block region, data of a character line region which is a sub-constituent in the region is stored, and furthermore, in the character line region, data for each single character region which is sub-constituent of the character line region is stored. In the case of a constituent having no sub-constituent, a pointer for a table distinguishing image data in a smallest unit region is stored instead of a number of sub-constituent. The table for distinguishing image data in a smallest unit region is represented by a set of classification, data size, data length in the longitudinal direction and a pointer for image data. The classification in this table is, for example, "bitmap" representing a monochrome image or "pixmap" representing a color image. Since the segmented regions are rectangular and are variable-length data, "data size" and "data length in the longitudinal direction" are stored, but it is not necessary to limit the classification form to them provided that it represents the image data in the region. FIG. 25 shows an example of storing data of a text region in a document shown in FIG. 24 as a hierarchical structure. A result of region segmentation is represented by a form of a table as shown in FIG. 26. The data, namely, the layout structure is transmitted to the logical identifier assigning module 2232.

Figure 28:
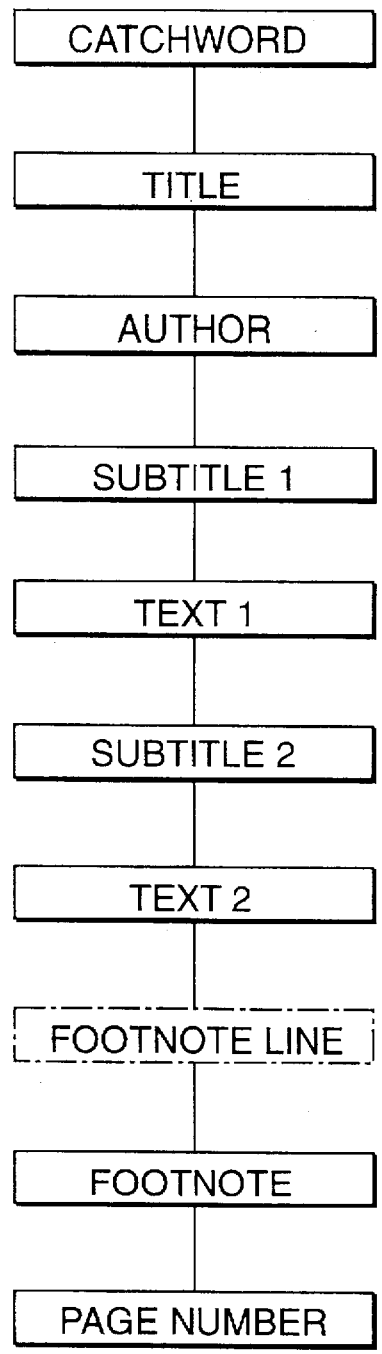
FIG. 28 shows an example of a model of a structural document.

The logical identifier assigning module 2232 carries out a match of the input layout structure and the stored structure model, and then assigns an identifier indicating a logical name to the highest constituent of the layout structure (step 2307). The identifiers are, for example, "title", "author", "subtitle", "text", "footnote" or "footnote line" as shown in FIG. 27. Here, the highest constituent of the layout structure is defined as a constituent which is not a sub-constituent of another constituent. The character block region has a hierarchical structure and a single identifier is only assigned to the character block, namely the highest character block; accordingly, the identifier is not assigned to the character line region and the character region. Ordinarily, many documents circulating in a certain field have formats which are fixed to some degree, for example, "title" and "author" are arranged in a pair. The structure model, namely, a template for design of document, utilize this tendency, and plural structure models (templates) are stored in a ROM or the like in advance. As shown in FIG. 28, the structure model is represented as a graphic structure so that a constituent is indicated by a node having a logical name corresponding to a classification (a character block, a character line, a ruled line, and so forth) of the constituent, and a relative positional relationship between constituents is indicated by a link. A matching process in this module means making determination whether the input layout structure matches with one of the stored structure model or not. The stored structure models are taken off one by one and the matching process is operated on those models in due order until matching succeeds. If the input layout structure does not match any structure model, a message "input document cannot be processed" is displayed on the control panel and the process terminates without carrying out any subsequent processes. If matching succeeds between the input layout structure and one of the structure models, utilizing correspondence between a constituent of the layout structure and a node of the structure model shown in FIG. 28, a logical identifier defined in the node of the structure model is assigned to each of the constituents of the layout structure which are the object of matching. As a result, a layout structure to which logical identifiers are assigned as shown in FIG. 30 can be obtained. With respect to sub-constituents which are not the object of assigning logical identifiers, 0 is stored as a value indicating a state in which identifier is not assigned. Data of the layout structure to which logical identifiers are assigned is transmitted to the character size distinction module 2233.

The character size distinction module 2233 distinguishes a character whose size is changed for emphasis or the like (step 2308). A distinction criterion (a threshold level) is determined based on an average size of characters and a character is distinguished by comparing its size with the threshold level. In general, the character regions having different logical names have different character sizes, for example, characters of "title" are larger than those of "text" in an ordinary document; therefore, distinction is carried out for each logical identifier. FIG. 31 shows an example in which the threshold level for distinction is obtained by ×1.1 magnification of average value of size and the height of the rectangle is taken as the character size. In an example of FIG. 30, size of a character having a constituent number 50 in a constituent having a logical identifier 5, namely "catchword" is larger than the threshold level 5.4. in FIG. 31, and size of a character having a constituent number 59 is not exceeding the threshold level 5.4. Consequently, it can be understood that the character having the constituent number 50 is an emphasized character and the character having the constituent number 59 is a normal character. FIG. 32 shows an example data of the layout structure to which the above determination result is assigned. In the example of FIG. 32, the determination result is assigned to a table for distinguishing image data in a smallest unit region. The data of the layout structure to which the result of character size distinction is assigned is transmitted to the character image conversion module 2234.

The character image conversion module 2234 converts bitmap data of the emphasized character into corresponding pixmap data (step 2309). FIG. 33 is an example of a table representing pixmap data corresponding to bitmap data, which is stored in ROM or the like in advance. The "size" shown in the table represents the ratio of the converted character size to the character size in the text. It is possible to prepare plural tables and switch them in accordance with the user's direction. In the example of FIG. 32, the logical identifier 5 (catchword) includes emphasized characters and normal characters: the emphasized characters are determined to be ×0.8 magnification of the text character size with 100% of cyan, and the normal characters are determined to be ×0.8 magnification of the text character size with 100% of black. The average size of the text character is 6.0; therefore each size of the emphasized characters and the normal characters of the logical identifier 5 (catchword) is calculated to be about 5. The height of 7 of the emphasized character is converted into height of 5, that is, magnification rate is about 0.7; accordingly the emphasized character is converted into an image of rectangular height of about 5 and rectangular width of about 4. FIG. 34 shows a layout structure data in which the image data is converted as described above, which is transmitted to the document image generation module 2235.

Figure 35:
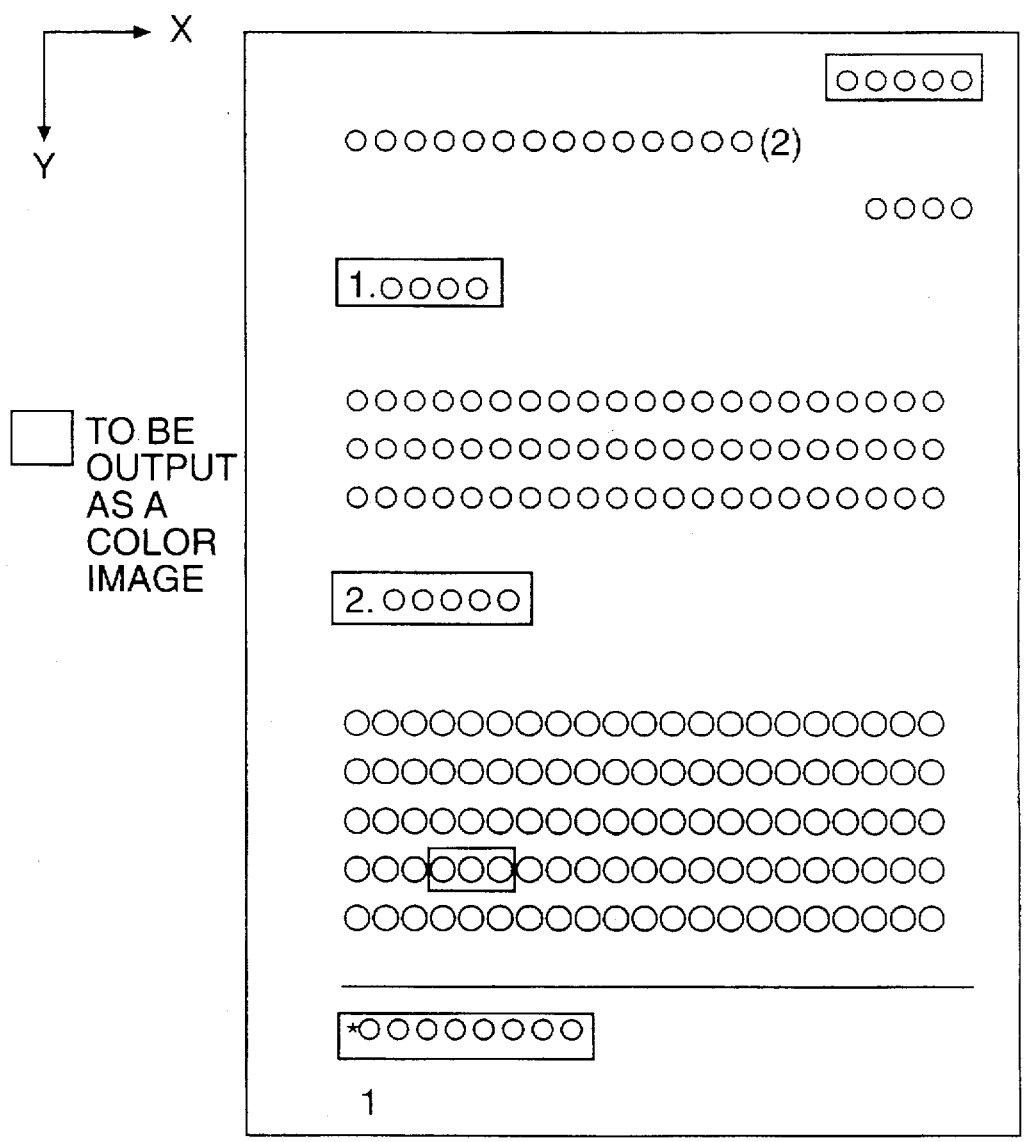
FIG. 35 shows an example of a document output from the third embodiment of the document image processing device according to the present invention.

The document image generation module 2235 allocates image data in the layout image data per each of the color components C, M, Y and K to the paper space by the text layout process and generates an ultimate image for the output document (step 2310). After completion of generation of image of the output document, the control module 225 starts the printer 224 and the output document as shown in FIG. 35 can be obtained (step 2311). In FIG. 35, reticulated parts are output as colored characters.

Fourth Embodiment

Figure 36:
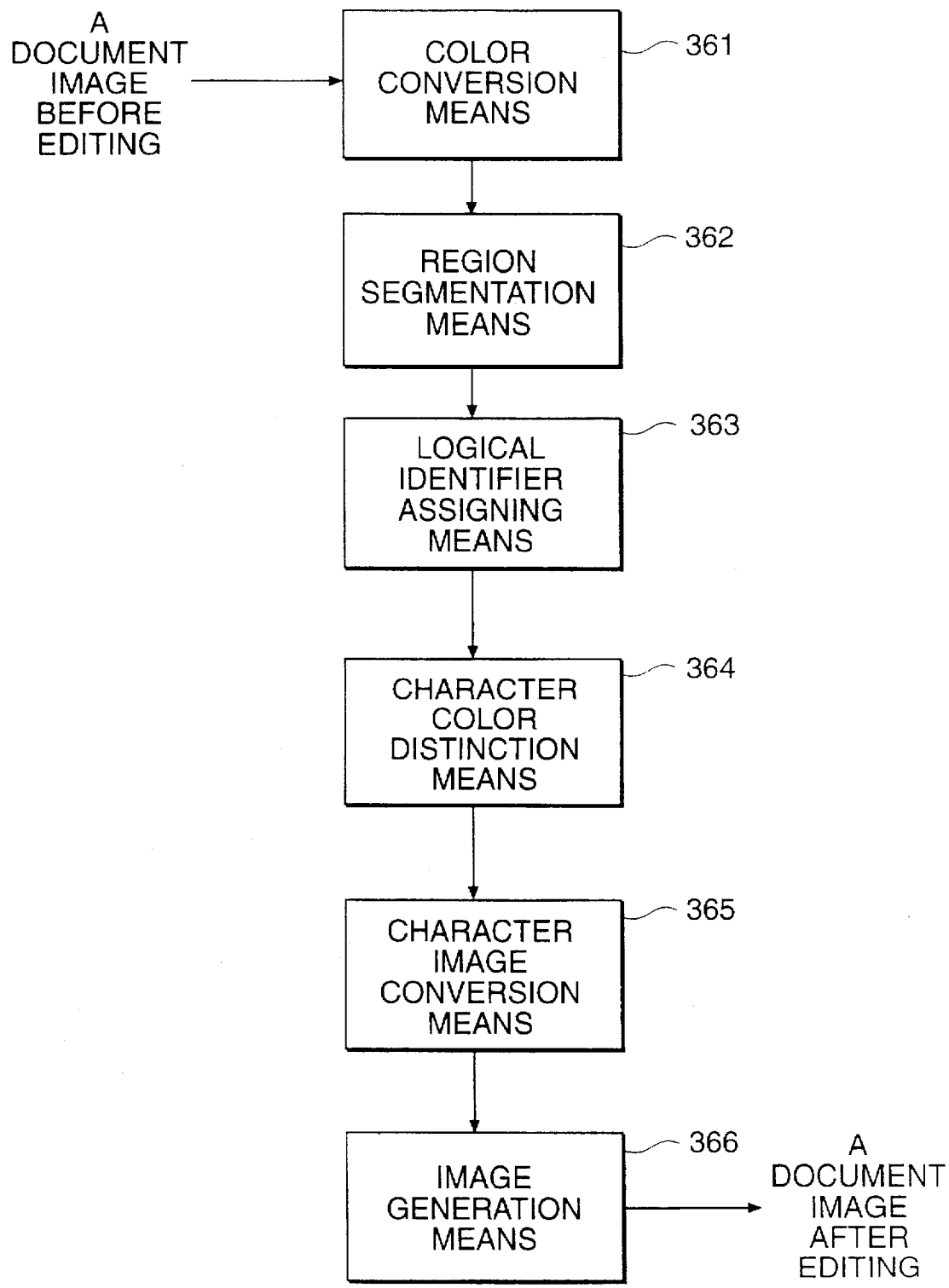
FIG. 36 shows the construction of a fourth document image processing device according to the present invention.
Figure 37:
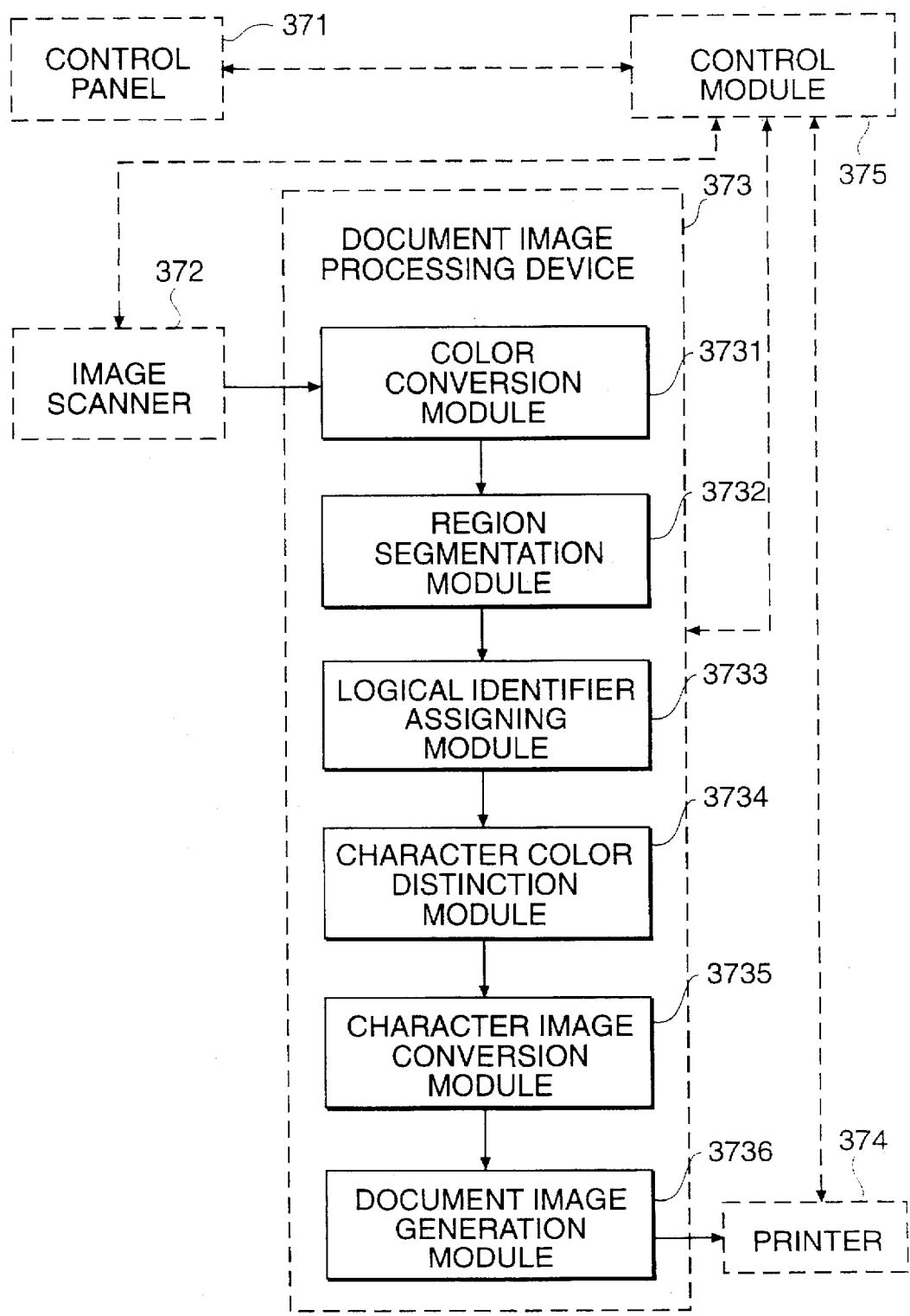
FIG. 37 shows the construction of a fourth embodiment which applies the fourth document image processing device according to the present invention to a digital color copying machine.

FIG. 37 shows the structure of fourth embodiment which applies a document image processing device according to the present invention shown in FIG. 36 to a digital color copying machine.

A color conversion module 3731 converts input density data for color components of B, G and R into toner signals of yellow (Y), magenta (M), cyan (C) and black (K). During the conversion, various data processing such as density adjustment, contrast adjustment, color balance adjustment or the like may be performed to improve reproducibility of color, gradation or preciseness.

A character color distinction module 3734 distinguishes a region in which characters are emphasized by changing their color from layout structure data having same logical identifiers. A distinction criterion is determined based on an average density value of each of separated color signal, components C, M, Y and K of characters having the same logical identifiers and the color of the character is distinguished by comparing density with the distinction criterion.

The other constituents are the same as those of the first, second and third embodiments.

Figure 38:
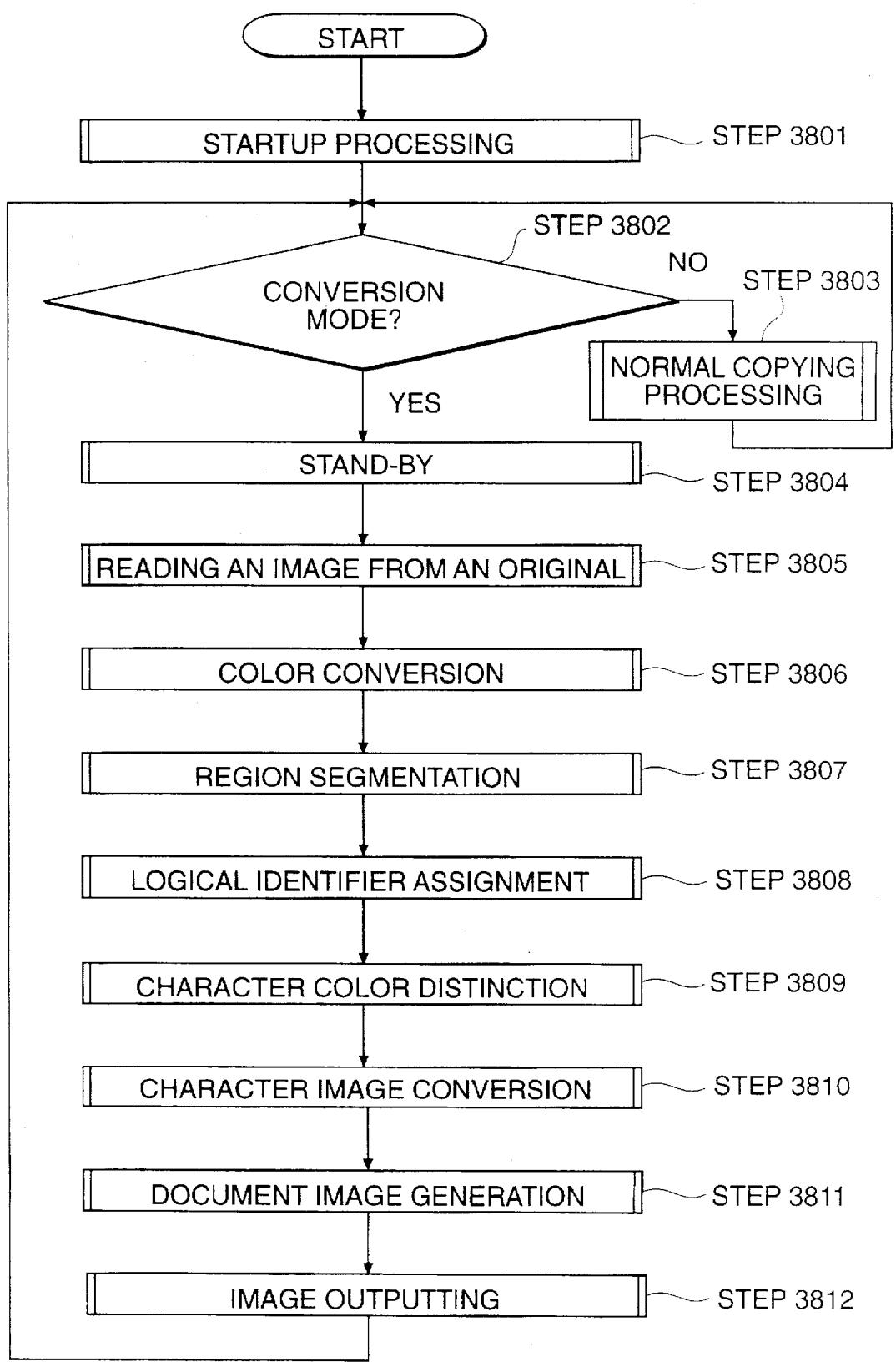
FIG. 38 is a flow chart showing processing of the fourth embodiment of the document image processing device according to the present invention.

The operation of the fourth embodiment with the above construction is described based on a flow chart in FIG. 38.

In contrast with the first embodiment, this embodiment will be described taking conversion of the document in FIG. 35 into a monochrome one as an example. As same as the other embodiments, the x-axis of the coordinates extends in right direction of the space and the y-axis extends in downward direction of the space.

At first the power supply is provided, and then the control module 375 carries out startup process (step 3801) and an initial image is displayed on the control panel. If the user presses the "monochrome conversion" button, the monochrome conversion mode is selected; otherwise a normal copying process is carried out (step 3803). After the monochrome conversion mode is selected, the machine is on stand-by for the press of the "start" button (step 3804).

The user puts the document on the platen and presses the "start" button, whereby the control module 375 starts the image scanner 372 to read the document image as a digital image consisting of components B, G and R (step 3805), which is transmitted to the color conversion module 3731.

Figure 39:
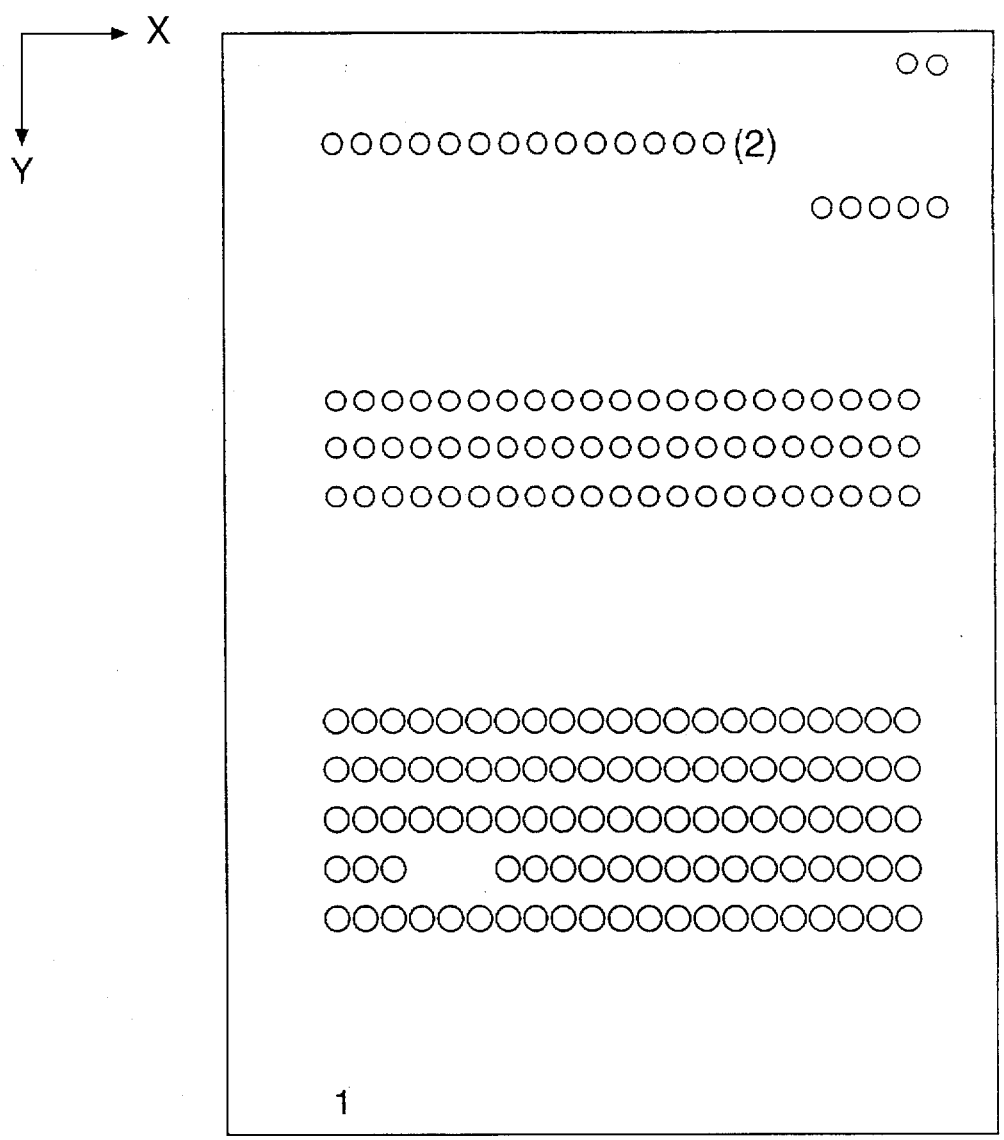
FIG. 39 shows an example of a document image of K, which is one of separated color component images in the fourth embodiment of the document image processing device according to the present invention.
Figure 40:
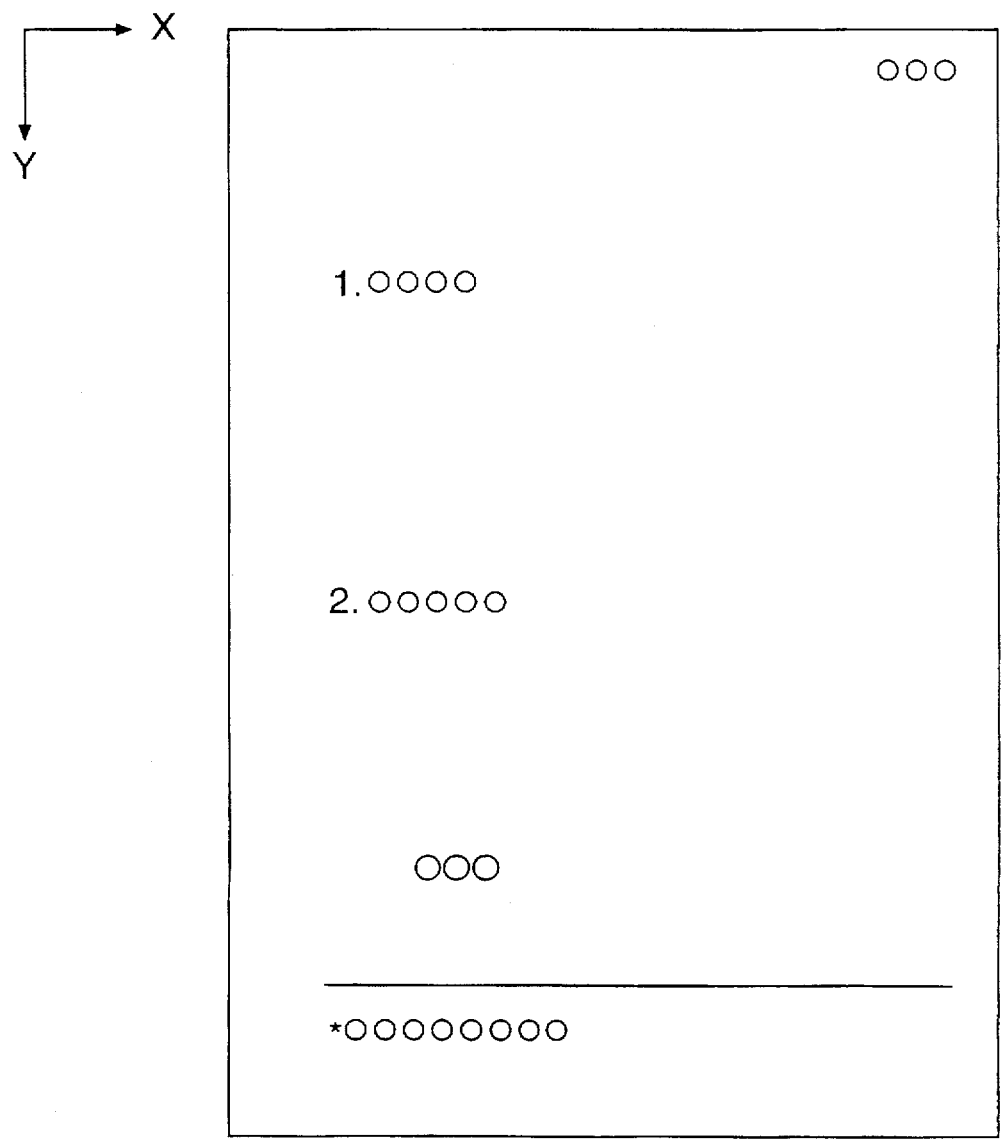
FIG. 40 shows an example of a document image of C, which is one of separated color component images in the fourth embodiment of the document image processing device according to the present invention.

The color conversion module 3731 converts the color density data for B, G and R into the color density data for C, M, Y and K (step 3806). Supposing that the image in FIG. 35 is printed with components C and K only, converted image data is as shown in FIG. 39 and FIG. 40, which are transmitted to a region segmentation module 3732.

Figure 41:
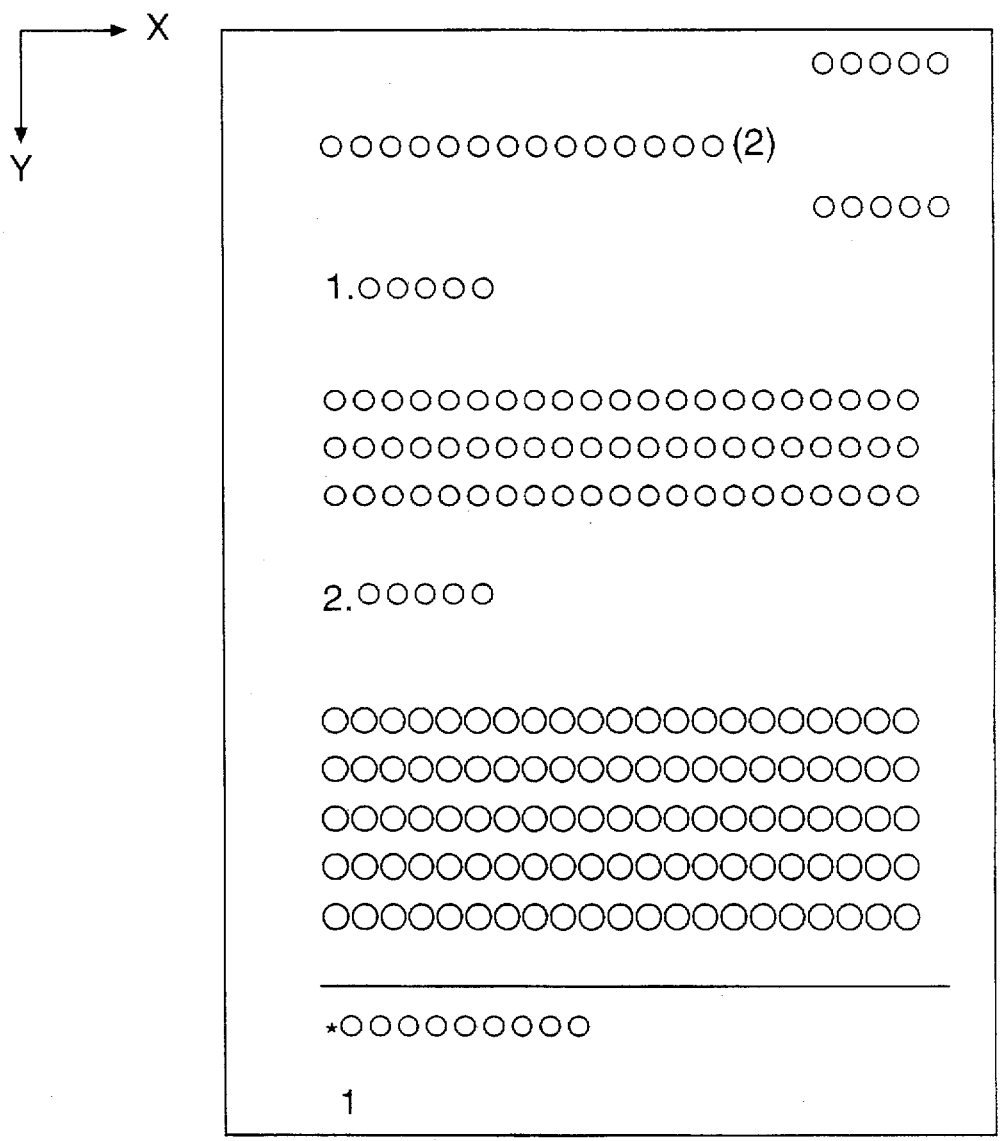
FIG. 41 shows an example of a document image recomposed after separating into color component images.

The region segmentation module 3732 first ORs the color images obtained by the color conversion module and prepares image data as shown in FIG. 41. By using these image data, it is possible to carry out region segmentation by the process similar to the region segmentation in the first embodiment. As a result, the input color image shown in FIG. 35 is segmented into a region where characters are arranged in a block, a region including ruled lines and other (blank) regions (step 3807). The result of region segmentation is represented by a table form as shown in FIG. 42. In the example of FIG. 42, as a result of the region segmentation, data which is all blank except for the region of K is stored as the bitmap data and data which is not blank except for the region of K is stored as the pixmap data. The layout structure obtained by this module is transmitted to the logical identifier assigning module 3733.

The logical identifier assigning module 3733 carries out exactly the same process as of the third embodiment. As a result, a layout structure to which logical identifiers are assigned as shown in FIG. 43 can be obtained (step 3808). The layout structure data with logical identifiers is transmitted to the character color distinction module 3734.

The character color distinction module 3734 distinguishes characters whose color is changed for the purpose of emphasis or the like (step 3809). The distinction criterion (threshold level) is determined based on an average density of color of the character, and colored characters are distinguished from normal (black) characters by comparing the color of the character with the threshold level. In an ordinary document, as same as the third embodiment, there are many cases in which color of the characters are different on the logical name basis; therefore distinction is carried out for each of the logical identifiers. FIG. 44 shows an example of a density as the threshold level for distinction, which is 10% higher than the average density. Since there is no data for the components M and Y, threshold levels for these components are 0. Here, an average density is given by multiplying each of density values and area of the density value, which is a total amount of toner in a region, and dividing it by area of the whole region. Distinction is carried out by comparing the values of M, Y and C with the threshold level in this order. In the example of FIG. 43, if it is assumed that a character having the constituent number 50 in the logical identifier 5, namely the constituent "catchword", is larger than the threshold level for C shown in FIG. 44, and a character having the constituent number 59 is not exceeding the threshold level, it is understood that the character having the constituent number 50 is an emphasized character and the character having the constituent number 59 is a normal character. An example of data of the layout structure to which the distinction result is attached is shown in FIG. 45. This data is transmitted to the character image conversion module 3735.

The character image conversion module 3735 converts the pixmap data of the emphasized character into corresponding bitmap data (step 3810). FIG. 46 is an example table showing bitmap data corresponding to pixmap data, which is stored in ROM for example, in advance. The "size" shown in the table represents the ratio of the converted character size to the character size in the text. It is possible to prepare plural tables and switch them in accordance with the user's direction. As a result of conversion with referring to the table in FIG. 46, the pixmap data is converted into the bitmap data as same as the third embodiment. FIG. 47 shows an example of the data of the layout structure after image data conversion, which is transmitted to the document image generation module 3736.

The document image generation module 3736 allocates each components of C, M, Y and K of the image data in the data of the layout structure to the paper space by character allocation process and generates an ultimate image of output document (step 3811). After generation of the image in the output document is completed, the control module starts the printer, thus providing an output document as shown in FIG. 24 (step 3812).

As described above, according to the present invention, two-way conversion between the monochrome document and the color document can be automatically performed. Conversion of the monochrome document into the color document easily provides a document having high color effect and looking more attractive. Conversion of the color document into the monochrome document can prevent the parts emphasized by coloring from being conversely weakened and becoming unnoticeable because an emphasis method of character by coloring is converted into a monochrome emphasis method.

Moreover, by recognizing a logical structure, an emphasized part in constituents having the same logical identifier in a layout structure can be distinguished, whereby conversion of the emphasis method is carefully carried out between the monochrome document and the color document.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A document image processing device comprising:
    region segmentation means for segmenting a set of pixels in a document into a plurality of regions;
    character size distinction means for classifying the sizes of monochrome characters in said regions segmented by said region segmentation means;
    character image conversion means for converting characters of one or more sizes classified by said character size distinction means into characters of respective colors based on information indicating correspondence between sizes and colors of the characters; and
    document image generation means for composing an image for an output based on the image of said characters converted by said character image conversion means.

2. The document image processing device according to claim 1, further comprising:
    logical identifier assigning means for assigning logical identifiers each of which indicates a logical name in the document to said regions segmented by said region segmentation means, wherein said character size distinction means classifies the sizes of the characters according to said logical identifiers assigned by said logical identifier assigning means.

3. The document image processing device according to claim. 2, wherein said logical name indicated by said logical identifier is one selected from the group of text, title, subtitle, page number, catchword, footnote, footnote line and author.

4. A document processing device comprising:

region segmentation means for segmenting a set of pixels in a document into a plurality of regions:

character color distinction means for classifying colors of characters in said regions segmented by said region segmentation means;

character image conversion means for converting characters of one or more colors classified by said character color distinction means into black characters of respective sizes based on information indicating correspondence between sizes and colors of the characters; and document image generation means for composing an image for an output based on the image of said characters converted by said character image conversion means.

5. The document image processing device according to claim 4, further comprising:

color conversion means for converting an image of a BGR color space into an image of YMCK color space, wherein said character color distinction means for classifying the colors of the characters based on components of the YMCK color space of the characters in said region segmented by said region segmentation means.

6. The document image processing device according to claim 4, further comprising:

logical identifier assigning means for assigning logical identifiers each of which indicates a logical name in the document to regions segmented by said region segmentation means; and wherein said character color distinction means classifies the colors of the characters according to said logical identifiers assigned by said logical identifier assigning means.

7. The document image processing device according to claim 5, further comprising:

logical identifier assigning means for assigning logical identifiers each of which indicates a logical name in the document to regions segmented by said region segmentation means, wherein said character color distinction means classifies the colors of the characters, according to said logical identifiers assigned by said logical identifier assigning means.

* * * * *